(12) United States Patent
Tabuchi

(10) Patent No.: US 7,313,301 B2
(45) Date of Patent: Dec. 25, 2007

(54) OPTICAL FIBER DEVICE, OPTICAL MONITOR AND OPTICAL SWITCH

(75) Inventor: Haruhiko Tabuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 11/046,780

(22) Filed: Feb. 1, 2005

(65) Prior Publication Data

US 2006/0093264 A1    May 4, 2006

(30) Foreign Application Priority Data

Nov. 1, 2004    (JP)    ............... 2004-318338

(51) Int. Cl.
G02B 6/32    (2006.01)
G02B 6/26    (2006.01)
G02B 6/42    (2006.01)

(52) U.S. Cl. .................. 385/33; 385/24; 385/39; 385/44; 385/47; 385/50

(58) Field of Classification Search .............. 385/24, 385/31, 33, 39, 44, 47, 50
See application file for complete search history.

(56) References Cited

U.S. PATENT DOCUMENTS

| | | | |
|---|---|---|---|
| 4,143,941 A * | 3/1979 | Soref | 385/18 |
| 6,438,290 B1 | 8/2002 | Bietry et al. | 385/33 |
| 6,657,771 B2 | 12/2003 | Okayama | 359/290 |
| 6,775,068 B2 * | 8/2004 | Lomas et al. | 359/619 |
| 7,103,244 B2 * | 9/2006 | Chen et al. | 385/24 |
| 2001/0046345 A1 * | 11/2001 | Snyder et al. | 385/16 |
| 2004/0198453 A1 * | 10/2004 | Cutrer et al. | 455/562.1 |
| 2005/0265652 A1 * | 12/2005 | Blumberg et al. | 385/16 |
| 2006/0029322 A1 * | 2/2006 | Mihailov et al. | 385/12 |

FOREIGN PATENT DOCUMENTS

| | | |
|---|---|---|
| JP | 57-105607 | 6/1982 |
| JP | 01-177003 | 7/1989 |
| JP | 02-165110 | 6/1990 |
| JP | 8-15564 | 1/1996 |
| JP | 2001-324644 | 11/2001 |
| JP | 2002-55276 | 2/2002 |
| JP | 2002-124723 | 4/2002 |
| JP | 2002-214546 | 7/2002 |

* cited by examiner

*Primary Examiner*—Frank G. Font
*Assistant Examiner*—Michael P. Mooney
(74) *Attorney, Agent, or Firm*—Staas & Halsey LLP

(57) ABSTRACT

In order to enable coupling two multi-mode optical fibers with relatively high efficiencies while increasing the distance between lenses to be interposed as compared with the prior arts, with a device according to the present invention, a first condenser lens and a second condenser lens are arranged such that they are spaced apart from each other by four times the focal length and their optical center axes are coincident with each other. A first (second) multi-mode optical fiber is arranged such that it is spaced apart from the first (second) condenser lens by a distance larger than the focal length and the center axis of light emitted from the first (second) multi-mode optical fiber is substantially coincident with the optical center axis of the first (second) condenser lens.

6 Claims, 23 Drawing Sheets

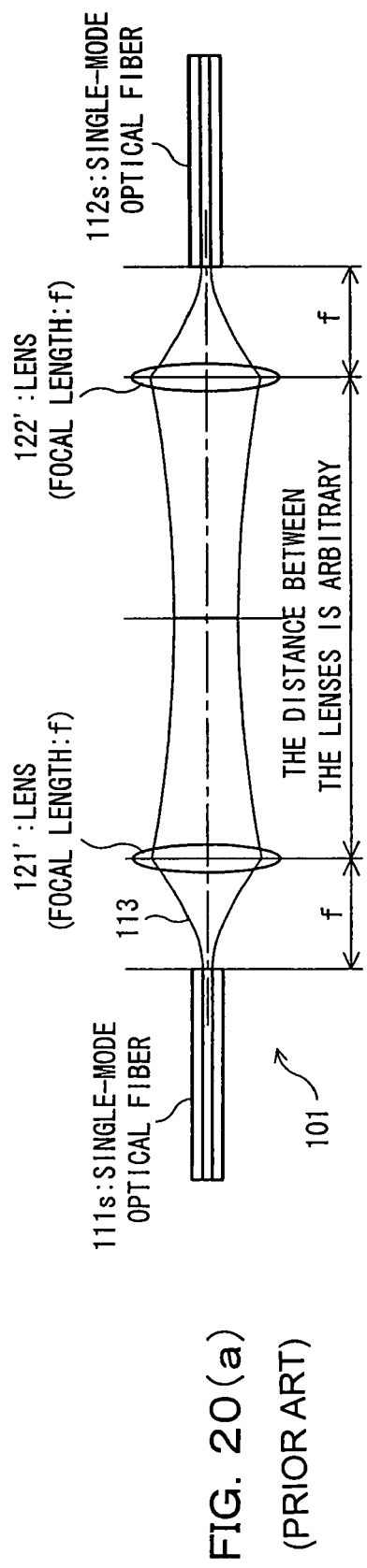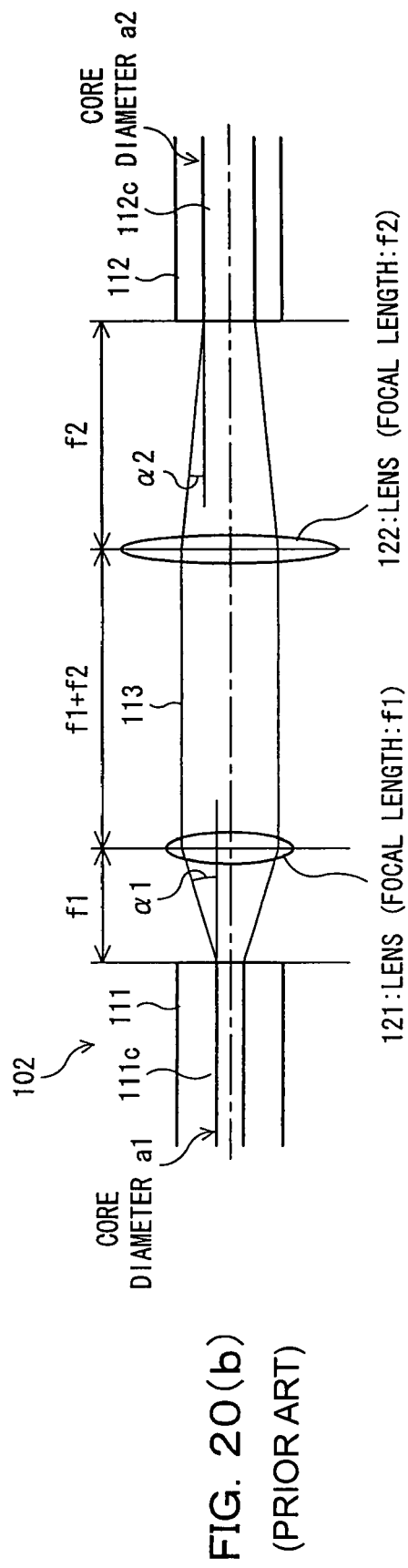
FIG. 20(a) (PRIOR ART)
FIG. 20(b) (PRIOR ART)

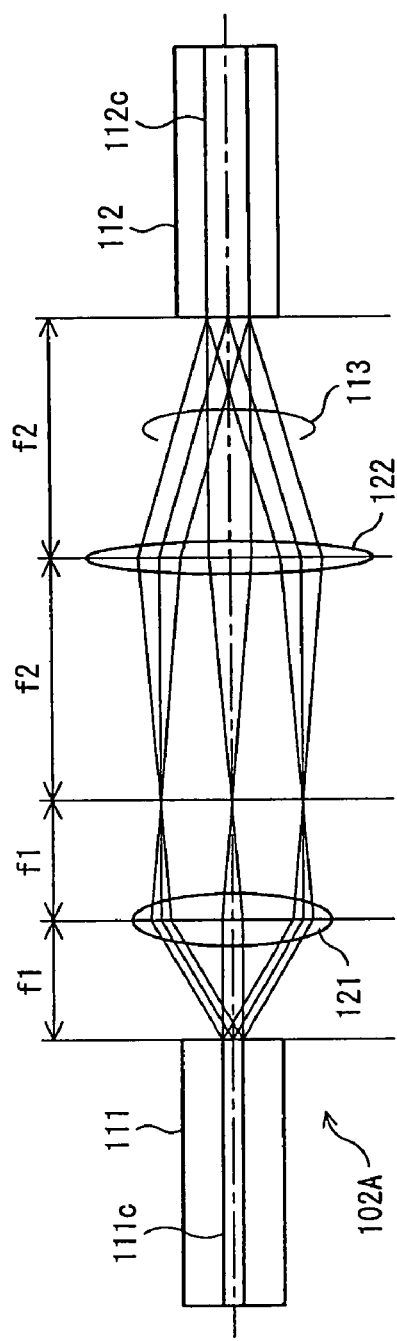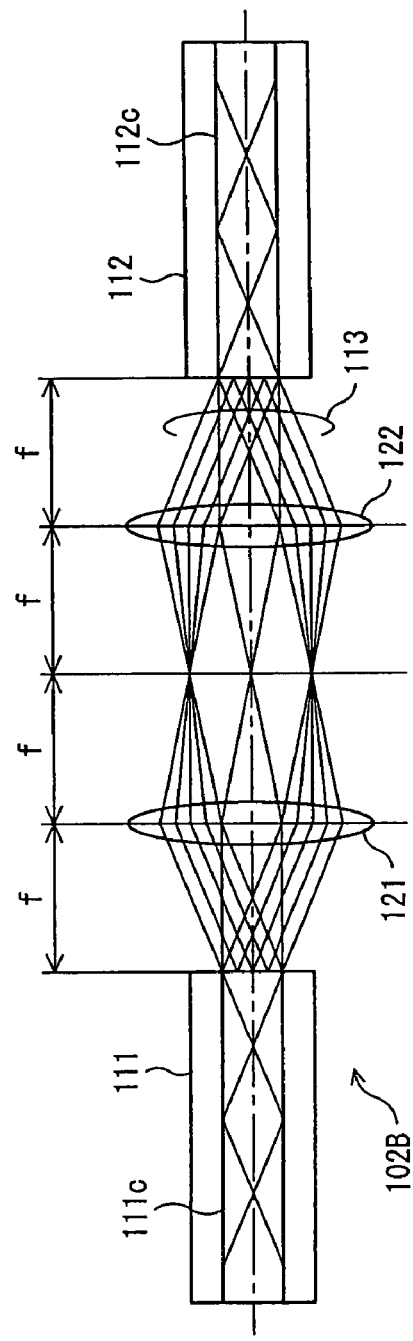
FIG. 21(a) (PRIOR ART)
FIG. 21(b) (PRIOR ART)

OPTICAL FIBER DEVICE, OPTICAL MONITOR AND OPTICAL SWITCH

BACKGROUND OF THE INVENTION

1) Field of the Invention

The present invention relates to optical fiber devices adapted to be suitably used in coupling optical fibers optically or in branching light propagating through optical fibers for optical branching. Further, the present invention relates to optical monitors and optical monitors.

2) Description of the Related Art

In Internet data centers (IDCs), etc., a plurality of server computers are used and their data input/output ports are utilized by interconnecting them through multi-mode fibers. In the existing circumstances, in order to switch connections depending on the service to be provided, the switching is performed manually and therefore there is a demand for provision of a technique, which enables automatically switching connections of multi-mode optical fibers. More specifically, there is a demand for an optical switch for switching connections among multi-mode optical fibers.

As a method for configuring such an optical switch, for example, as an optical switch 100 illustrated in FIG. 18, there is a method in which a single optical fiber 111 and N optical fibers 112-1 to 112-N are opposed to each other and the single optical fiber 111 is mechanically moved to switch connections. Namely, by mechanically moving the optical fiber 111 through an actuator 117, a single optical fiber 112-i (i=i to N) to be optically coupled to the optical fiber 111 can be selectively switched, among the N optical fibers.

In order to realize the optical switch 100 as described above, there is required an optical-fiber optical coupling technique which facilitates mechanically moving the optical fibers 112-1 to 112-N as well as attenuating back-reflected-light and enables high-efficiency optical coupling, in order to switch among the optical fibers 112-1 to 112-N opposed to the optical fiber 111.

In order to realize the optical coupling between the optical fibers 111, 112-i in the aforementioned optical switch 100 illustrated in FIG. 18 by using multi-mode optical fibers, utilization of a butt-joint coupling system illustrated in FIG. 22, which will be described later, is generally conceived, in view of the fact that reduction of a loss is facilitated.

Further, when the aforementioned multi-mode optical fibers are interconnected, there is also a need to provide a function of monitoring the optical coupling efficiency based on the switching of optical fibers as described above, in order to maximize the coupled light power. Namely, based on the result of monitoring using the monitoring function, the position of the optical fiber 111 is adjusted by an actuator such that the coupled light power is maximized.

For example, as exemplified in FIG. 19, when the optical fiber 111 and the optical fiber 112-i are coupled to each other, there are provided, on the respective optical fibers 111, 112-i, in-line power monitors 81, 82 for monitoring the light power coupled to the respective optical fibers 111, 112-i, and there is also provided a controller 116. Thus, this controller 116 controls the actuator 117 based on the result of monitoring through the in-line power monitors 81, 82 to adjust the position of the optical fiber 111 such that the coupled power is maximized.

Further, in order to monitor the light output using the aforementioned power monitors 81, 82, it is common practice to branch light propagated through the optical fibers 111, 112-i for extracting light to be monitored. Thus, there is also a demand for an optical branching technique, which brings about a low branching excess loss in performing such optical branching.

Technique of Optically Coupling Optical Fibers

As the aforementioned technique of optically coupling optical fibers, there are lens coupling systems 101, 102, for example, as illustrated in FIG. 20(a) and FIG. 20(b). In the lens coupling system illustrated in FIG. 20(a), single-mode optical fibers 111s, 112s opposed to each other are optically coupled to each other through two condenser lenses 121', 122' having substantially the same focal length. Namely, light emitted from the single-mode optical fibers 111s, 112s is converted into parallel light rays by the condenser lenses 121', 122' and then is converged again and coupled. In FIG. 20(a) and FIG. 20(b), the reference character 113 designates light beams.

In the lens coupling system 101, the distance between the lenses 121', 122' can be arbitrarily set while the lenses 121', 122' and the single-mode optical fibers 111s, 112s are arranged such that the end face of the single-mode optical fiber ills is arranged at the focal length of the lens 121' and the end face of the single-mode optical fiber 112s is arranged at the focal length of the lens 122'. In the case where the lens coupling system 101 is used for optical coupling between the single-mode optical fibers 111s, 112s having the same configuration, the converged-light spot size of light 113 at the beam waist is identical with the divergent angle of diffraction, so as to allow realization of a low-loss coupling system.

The lens coupling system 102 illustrated in FIG. 20(b) is disclosed, for example, in the following patent literatures 1 to 3. In the lens coupling system 102, similarly, two optical fibers 111, 112 opposed to each other are interconnected through two condenser lenses 121, 122. However, the focal length of the lens 121 is f1 and the focal length of the lens 122 is f2, which is different from f1. The lens 121 is arranged at a location associated with the focal length of the optical fiber 111 and the lens 122 is arranged at the focal length of the optical fiber 112, while the distance between the lenses 121, 122 is set to f1+f2. Here, 111c and 112c are the cores of the optical fibers 111, 112, respectively.

When the lens coupling system 102 is used for interconnecting single-mode optical fibers having the same configuration or for interconnecting multi-mode optical fibers having the same configuration, the converged-light spot size of light 113 near the end faces of the optical fibers 111, 112 is in conformity with the incident/output angle of light, so as to allow realization of a low-loss coupling system. Herein the statement "the lens coupling system is used for interconnecting multi-mode optical fibers having the same configuration" refers to the case where the core diameter a1 of the optical fiber 111 and the core diameter a2 of the optical fiber 112 are equal, the largest tilt angle α1 of light emitted from the core 111c of the optical fiber 111 and the largest tilt angle α2 of light emitted from the core 112c of the optical fiber 112 are equal in FIG. 20(b) and the lens coupling system is used for interconnecting these multi-mode optical fibers. Further, in the case where the distance between the lenses in the lens coupling system 101 is set to 2f, there is to be obtained the lens coupling system having the same configuration as the coupling system 102 in which the focal lengths f1, f2 of the two lenses are identical in the length f and the largest tilt angles α1 and α2 of light emitted from the cores of the two optical fibers are equal.

When the lens coupling system 102 is used for optically coupling optical fibers (including multi-mode optical fibers) having different core diameters, a low-loss coupling system can be realized in the case where the following conditions #1 and #2 are satisfied at the same time, wherein the divergent tilt angles of light incident on and emitted from the optical fibers 111, 112 are defined as $\alpha 1$ and $\alpha 2$, respectively, as illustrated in FIG. 20(*b*). Here, the diameter of the core 111*c* of the optical fiber 111 is defined as a1 and the diameter of the core 112*c* of the optical fiber 112 is defined as a2. The focal length of the condenser lens 121 is defined as f1 and the focal length of the condenser lens is defined as f2.

Condition #1: the ratio between f1 and f2 is equal to the ratio between a1 and a2.

Condition #2: the ratio between tan ($\alpha 2$) and tan ($\alpha 1$) is equal to the ratio between a1 and a2.

A lens coupling system 102A in FIG. 21(*a*) illustrates an example where the lens coupling system 102 in FIG. 20(*b*) is used for interconnecting optical fibers having different core diameters and a lens coupling system 102B in FIG. 21(*b*) illustrates an example where the lens coupling system 102 is used for interconnecting optical fibers having the same core diameter. When the diameters of the cores 111*c*, 112*c* are equal as in the lens coupling system 102 illustrated in FIG. 21(*b*), the focal lengths of the two condenser lenses 121, 122 are equal and the distance between the lenses is twice the focal length of the lenses, based upon the aforementioned conditions #1 and #2.

The lens coupling system illustrated in FIG. 21(*b*) can be applied for interconnecting optical fibers having the same configuration either when the optical fibers are single-mode optical fibers or when the optical fibers are multi-mode optical fibers, and the distance between the lenses 121, 122 will be fixed to f1+f2.

Further, as another optical-fiber coupling system, there is a butt-coupling system 103 as exemplified in FIG. 22. In the butt-coupling system 103, the end faces 111*e*, 112*e* of two optical fibers 111, 112 are opposed to each other and butted against each other to optically couple them. When the butt-coupling system 103 is utilized for optically coupling single-mode optical fibers having the same configuration or multi-mode optical fibers having the same configuration, a low-loss coupling system can be realized in the case where there is no space (gap) G between the butted optical fibers 111, 112 and no reflection at the end faces 111*e*, 112*e*.

Optical Branching Technique

It is conceivable to apply an optical-fiber coupler described in the following patent literature 4 as the optical branching technique for monitoring the condition of coupling between fibers. The patent literature 4 discloses an optical-fiber coupler 4 as illustrated in FIG. 23. The optical coupler 104 illustrated in FIG. 23 is configured by bringing two optical fibers 91, 92 close to each other, thermally fusing and then drawing them.

The optical-fiber coupler 104 is configured such that the cores 91*c*, 92*c* are brought close to each other in the fused/drawn portion 93. Namely, when an AA' cross section 94A of the fused/drawn portion 93 is compared with a BB' cross section 94B of the other portion, it can bee seen that the cores 91*c*, 92*c* are relatively close to each other. Therefore, by coupling evanescent waves between the cores 91*c*, 92*c* at the fused/drawn portion 93, light from one of the cores is coupled to the other core, in such a manner as to branch the light. The longer the fused/drawn portion 93 becomes, the larger the amount of coupled light becomes and, therefore, the branched power becomes.

When the-optical fiber coupler 104 illustrated in FIG. 23 is utilized for causing light in single-mode optical fibers or single-mode wave guides to branch off, couplers with various branching ratios and low excess losses can be realized.

(Patent Literature 1) Laid-Open (Kokai) HEI 01-177003
(Patent Literature 2) Laid-Open (Kokai) HEI 08-15564
(Patent Literature 3) Laid-Open (Kokai) 2002-55276
(Patent Literature 4) Laid-Open (Kokai) 2001-324644

However, when the aforementioned optical-fiber coupler 104 illustrated in FIG. 23 is configured using multi-mode optical fibers, a difficulty arises in controlling the coupling of required evanescent waves, with the result that optical branching with stable branching ratios is unable to be realized. Therefore, there is a problem that the technique of the aforementioned optical-fiber coupler 104 illustrated in FIG. 23 cannot be utilized for optically branching multi-mode optical fibers.

On the contrary, as an optical system 105 illustrated in FIG. 25, for example, it is conceivable to arrange an optical branching member such as a half mirror 114 which reflects a part of the incident light power and passes a part thereof, between the condenser lenses 121', 122' in the lens coupling system 101 illustrated in FIG. 20(*a*), in order to cause light to branch off. Further, when light reflected at the half mirror 114 is received by a photoelectric conversion device 115 through a condenser lens 123 and an optical fiber 113, etc., light propagated between the optical fibers 111, 112 can be monitored. In FIG. 24, the same reference numerals or symbols as those in FIG. 20(*a*) designate substantially similar components.

However, if the lens coupling system 101 illustrated in FIG. 20(*a*) is used for interconnecting multi-mode optical fibers, this will increase the loss as will be described later. Therefore, there is a problem that the configuration in which the half mirror 114 is provided in the lens optical system 101 of FIG. 20(*a*) is difficult to use for multi-mode optical fibers.

A lens coupling system 101*m* illustrated in FIG. 25 is configured by applying the aforementioned lens coupling system 101 illustrated in FIG. 20(*a*) for interconnecting multi-mode optical fibers. As illustrated in FIG. 25, when multi-mode optical fibers 111*m*, 112*m* are coupled or optically interconnected by means of the lens coupling system 101, the incidence angles of light ray components 133, 134, for example, incidence on the optical fiber 112*m* are greater than the angles of total reflection of light between the core and the clad of the optical fiber 112*m*. Therefore, the light ray components are not coupled to the optical fiber 112*m* (namely, they can not be propagated through the core of the optical fiber 112*m* while being totally reflected). This brings about losses when the optical fibers 111*m*, 112*m* are coupled. Further, the condition of modes propagating through the optical fibers 111*m*, 112*m* changes, which causes the light components 133, 134 constituting light beams to occur or disappear with time. This causes noise, consequently reducing the SN ratio (signal-to-noise ratio).

Also, it is conceivable to interpose a half mirror 114 as illustrated in FIG. 24 and a photoelectric conversion device 115 between the condenser lenses 121, 122 in the lens coupling system 102 illustrated in FIG. 20(*b*). However, since the distance between the condenser lenses 121, 122 is short, this restricts the sizes of optical members such as the half mirror 4 which can be installed between the lenses, which cause restrictions on the design.

SUMMARY OF THE INVENTION

The present invention has been made in view of the aforementioned problems and aims at providing optical fiber devices, optical monitors and optical switches which enable coupling two multi-mode optical fibers with relatively high efficiencies while increasing the distance between the lenses to be interposed as compared with the prior arts.

Further, the present invention aims at reducing restrictions on the design.

Therefore, an optical fiber device according to the present invention comprises a first multi-mode optical fiber, a second multi-mode optical fiber having a core radius rc and a numerical aperture NA which are substantially the same as those of the first multi-mode optical fiber, and a first condenser lens and a second condenser lens which have substantially the same focal length, wherein the first multi-mode optical fiber and the second multi-mode optical fiber are optically coupled to each other at their end faces through the first condenser lens and the second condenser lens, the first condenser lens and the second condenser lens are arranged such that they are spaced apart from each other by four times the focal length and their optical center axes are substantially put into coincidence with each other, the first multi-mode optical fiber is arranged such that it is spaced apart from the first condenser lens by a distance larger than the focal length and the center axis of light emitted from the first multi-mode optical fiber is substantially put into coincidence with the optical center axis of the first condenser lens, and the second multi-mode optical fiber is arranged such that it is spaced apart from the second condenser lens by a distance larger than the focal length and the center axis of light emitted from the second multi-mode optical fiber is substantially put into coincidence with the optical center axis of the second condenser lens.

In this case, preferably, another optical member may be interposed between the first condenser lens and the second condenser lens.

Also, as the other optical member, there may be provided a reflective member capable of reflecting incident light from the first multi-mode optical fiber or the second multi-mode optical fiber.

Also, the reflective member may be constituted by a branch mirror having a light-reflecting surface, which passes a part of incident light from the first multi-mode optical fiber or the second multi-mode optical fiber and reflects the remaining part to cause it to branch off.

Also, as the other optical member, the branch mirror may be arranged in such a position that the distance between the first or second condenser lens and the intersection point of the optical center axis of the first or second condenser lens and the light-reflecting surface of the branch mirror is substantially twice the focal length, wherein there may be provided a third condenser lens having substantially the same focal length as that of the first condenser lens and the second condenser lens, on the light path of light reflected by the branch mirror in terms of the incident light from the first multi-mode optical fiber or the second multi-mode optical fiber, and the third condenser lens may be arranged such that the optical center axis of the third condenser lens is put into coincidence with the optical center axis of light reflected by the branch mirror and its distance from the intersection point of the optical center axis of the first condenser lens and the light-reflecting surface of the branch mirror is substantially twice the focal length.

Also, as the other optical member, there may be provided, along with the branch mirror and the third condenser lens, a third multi-mode optical fiber having a core radius rc and a numerical aperture NA which are substantially the same as those of the first multi-mode optical fiber and the second multi-mode optical fiber, at the side of the third condenser lens opposite to the side of the branch mirror arranged, and the third multi-mode optical fiber may be arranged such that it is spaced apart from the third condenser lens by the focal length plus a predetermined distance and the center axis of light emitted from the end face of the third multi-mode optical fiber is substantially put into coincidence with the optical center axis of the third condenser lens.

Further, as the other optical member, there may be provided, along with the branch mirror, a photoelectric conversion device capable of photo-electrically converting light reflected by the branch mirror.

Also, as the other optical member, there may be provided, along with the branch mirror and the third condensing mirror, a photoelectric conversion device capable of photo-electrically converting light reflected by the branch mirror and then transmitted through the third condenser lens.

Also, as the other optical member, there may be provided, along with the branch mirror, the third condenser lens and the third multi-mode optical fiber, a photoelectric conversion device capable of photo-electrically converting light reflected by the branch mirror, then transmitted through the third condenser lens and then propagated through the third multi-mode optical fiber.

Further, the distance between the first multi-mode optical fiber and the first condenser lens and the distance between the second multi-mode optical fiber and the second condenser lens may be substantially equal to the sum of the focal length and a predetermined distance which depends on the core radius rc and the numerical aperture NA of the first and second multi-mode optical fibers.

Further, the distance between the first multi-mode optical fiber and the first condenser lens and the distance between the second multi-mode optical fiber and the second condenser lens may be substantially equal to the sum of the focal length and $\delta$ which is expressed by the equation $\delta = rc/\tan\{\arcsin(NA)\}$ using the core radius rc and the numerical aperture NA.

Further, in the aforementioned optical fiber device, the first multi-mode optical fiber may be arranged with respect to the first condenser lens such that a light ray proceeding from the outermost perimeter of the core of the first multi-mode optical fiber toward the optical center axis of the first multi-mode optical fiber and having a largest tilt angle with respect to the optical center axis of the first multi-mode optical fiber substantially passes through the position of the focal point of the first condenser lens between the first multi-mode optical fiber and the first condenser lens, and the second multi-mode optical fiber may be arranged with respect to the second condenser lens such that a light ray proceeding or traveling from the outermost perimeter of the core of the second multi-mode optical fiber toward the optical center axis of the second multi-mode optical fiber and having a largest tilt angle with respect to the optical center axis of the second multi-mode optical fiber substantially passes through the position of the focal point of the second condenser lens between the second multi-mode optical fiber and the second condenser lens.

Further, the distance between the first multi-mode optical fiber and the first condenser lens, the distance between the second multi-mode optical fiber and the second condenser lens and the distance between the third multi-mode optical fiber and the third condenser lens may be substantially equal to the sum of the focal length and $\delta$ which is expressed by the equation $\delta = rc/\tan\{\arcsin(NA)\}$ using the core radius rc and the numerical aperture NA.

Further, an optical monitor comprises a first multi-mode optical fiber, a second multi-mode optical fiber having a core radius rc and a numerical aperture NA which are substantially the same as those of the first multi-mode optical fiber, and a first condenser lens and a second condenser lens which have substantially the same focal length, wherein the first multi-mode optical fiber and the second multi-mode optical fiber are optically coupled to each other at their end faces through the first condenser lens and the second condenser lens, the first condenser lens and the second condenser lens are arranged such that they are spaced apart from each other by four times the focal length and their optical center axes are substantially put into coincidence with each other, the first multi-mode optical fiber is arranged with respect to the first condenser lens such that it is spaced apart from the first condenser lens by a distance larger than the focal length and the center axis of light emitted from the first multi-mode optical fiber is substantially put into coincidence with the optical center axis of the first condenser lens, and the second multi-mode optical fiber is arranged with respect to the second condenser lens such that it is spaced apart from the second condenser lens by a distance larger than the focal length and the center axis of light emitted from the second multi-mode optical fiber is substantially put into coincidence with the optical center axis of the second condenser lens, there is interposed, between the first condenser lens and the second condenser lens, a branch mirror having a light-reflecting surface which passes a part of incident light from the first multi-mode optical fiber or the second multi-mode optical fiber and reflects the remaining part to cause it to branch off, and there is provided a light monitoring section for monitoring the light branched by the branch mirror.

Further, an optical switch according to the present invention comprises a switching-source multi-mode optical fiber, a plurality of switching-destination multi-mode optical fibers having a core radius rc and a numerical aperture NA which are substantially the same as those of the switching-source multi-mode optical fiber, and an actuator capable of moving the switching-source multi-mode optical fiber such that the switching-source multi-mode optical fiber is optically coupled to one of the plurality of switching-destination multi-mode optical fibers, wherein the switching-source multi-mode optical fiber or the switching-destination multi-mode optical fibers or both of them comprise a first multi-mode optical fiber, a second multi-mode optical fiber having a core radius rc and a numerical aperture NA which are substantially the same as those of the first multi-mode optical fiber, and a first condenser lens and a second condenser lens which have substantially the same focal length as a first focal length, the first multi-mode optical fiber and the second multi-mode optical fiber are optically coupled to each other at their end faces through the first condenser lens and the second condenser lens, the first condenser lens and the second condenser lens are arranged such that they are spaced apart from each other by four times the first focal length and their optical center axes is substantially put into coincidence with each other, the first multi-mode optical fiber is arranged with respect to the first condenser lens such that it is spaced apart from the first condenser lens by a distance larger than the first focal length and the center axis of light emitted from this first multi-mode optical fiber is substantially put into coincidence with the optical center axis of the first condenser lens, and the second multi-mode optical fiber is arranged with respect to the second condenser lens such that it is spaced apart from the second condenser lens by a distance larger than the first focal length and the center axis of light emitted from this second multi-mode optical fiber is substantially put into coincidence with the optical center axis of the second condenser lens, there is interposed, between the first condenser lens and the second condenser lens, a branch mirror having a light-reflecting surface which passes a part of incident light from the first multi-mode optical fiber or the second multi-mode optical fiber and reflects the remaining part to cause it to branch off; and there is provided a light monitoring section for monitoring the light branched by the branch mirror.

In this case, preferably, the plurality of switching-destination multi-mode optical fibers may be arranged such that their end portions are aligned, there may be provided a base table for securing the end portion of the switching-source multi-mode optical fiber on the side of the switching-destination multi-mode optical fibers, the actuator may be configured to be capable of moving the switching-source multi-mode optical fiber through the base table along the direction of the alignment of the end portions of the switching-destination multi-mode fibers, there may be provided, on the base table, a third condenser lens and a fourth condenser lens which have substantially the same focal length as a second focal length, the switching-source multi-mode optical fiber and the one switching-destination multi-mode optical fiber may be optically coupled at their end faces through the third condenser lens and the fourth condenser lens, the third condenser lens and the fourth condenser lens may be arranged such that they are spaced apart from each other by four times the second focal length and their optical center axes are substantially put into coincidence with each other, the switching-source multi-mode optical fiber may be arranged such that it is spaced apart from the third condenser lens by a distance larger than the second focal length and the center axis of light emitted from this switching-source multi-mode optical fiber is substantially put into coincidence with the optical center axis of the third condenser lens, and the one switching-destination multi-mode optical fiber may be arranged such that it is spaced apart from the fourth condenser lens by a distance larger than the focal length and the center axis of light emitted from this one switching-destination multi-mode optical fiber is substantially put into coincidence with the optical center axis of the fourth condenser lens.

Further, an optical switch according to the present invention comprises a plurality of multi-mode optical fibers having substantially the same core radius rc and the same numerical aperture NA, a plurality of condenser lenses having substantially the same focal length and arranged facing the respective end faces of the plurality of multi-mode optical fibers, a reflective member capable of reflecting light emitted from the plurality of multi-mode optical fibers and then transmitted through the corresponding condenser lenses and capable of optically coupling at least one pair of multi-mode optical fibers out of the plurality of multi-mode optical fibers through the corresponding condenser lenses, an angle switching section capable of switching and setting the reflection angle of the reflective member in order to switch the pair of multi-mode optical fibers to be optically coupled to each other, the reflective member and the plurality of condenser lenses are arranged such that the distances between the plurality of condenser lenses and the intersection points of the optical center axes of the plurality of condenser lenses and the light-reflecting surface of the reflective member are substantially twice the focal length, the condenser lenses corresponding to the pair of multi-mode optical fibers to be optically coupled are arranged such that their optical center axes is substantially put into coincidence with each other through the reflective member, and each of the multi-mode optical fibers is arranged such that it is spaced apart by the focal length plus a predetermined distance from the condenser lens corresponding to the position at which the multi-mode optical fiber is arranged and the center axis of light emitted from the multi-mode optical fiber is substantially coincidence with the optical center axis of this corresponding condenser lens.

In this case, preferably, the respective condenser lenses which face the plurality of multi-mode optical fibers may be arranged along an arc with a radius length which is twice the focal length.

Further, preferably, the distance between each of the multi-mode optical fibers and the condenser lens corresponding to the position at which this multi-mode optical fiber is arranged may be substantially equal to the sum of the focal length and $\delta$ which is expressed by the equation $\delta = rc/\tan\{\arcsin(NA)\}$ using the core radius rc and the numerical aperture NA.

As described above, according to the present invention, the first and second condenser lenses are arranged such that they are spaced apart from each other by four times the focal length and their optical center axes are put into coincidence with each other. The first multi-mode optical fiber is arranged such that it is spaced apart from the first condenser lens by a distance larger than the focal length and the center axis of light emitted from the first multi-mode optical fiber is substantially put into coincidence with the optical center axis of the first condenser lens. The second multi-mode optical fiber is arranged such that it is spaced apart from the second condenser lens by a distance larger than the focal length and the center axis of light emitted from the second multi-mode optical fiber is substantially put into coincidence with the optical center axis of the second condenser lens. Therefore, when the first and second multi-mode optical fibers 11, 12 are optically coupled to each other, it is made possible to realize optical coupling with a low connection loss and low noise.

Further, as compared with lens optical systems of the prior arts, the distance between the first and second condenser lenses (inter-lens distance) can be increased, thereby making it easier to interpose other optical members between the first and second condenser lenses, so that there is attained an advantage that the applicability in designing the lens optical system can be improved.

BRIEF DESCRIPTION OF THE DRAWINGS

FIGS. 18 to 23 are views illustrating the prior arts.

DESCRIPTION OF THE PREFERRED EMBODIMENTS

Hereinafter, embodiments of the present invention will be described with reference to the drawings.

The aforementioned objects of the present invention, other technical problems to be solved, means for solving the technical problems and effects and advantages thereof will also become apparent from the following description of embodiments.

[A1] Description of a First Embodiment

Figure 1:
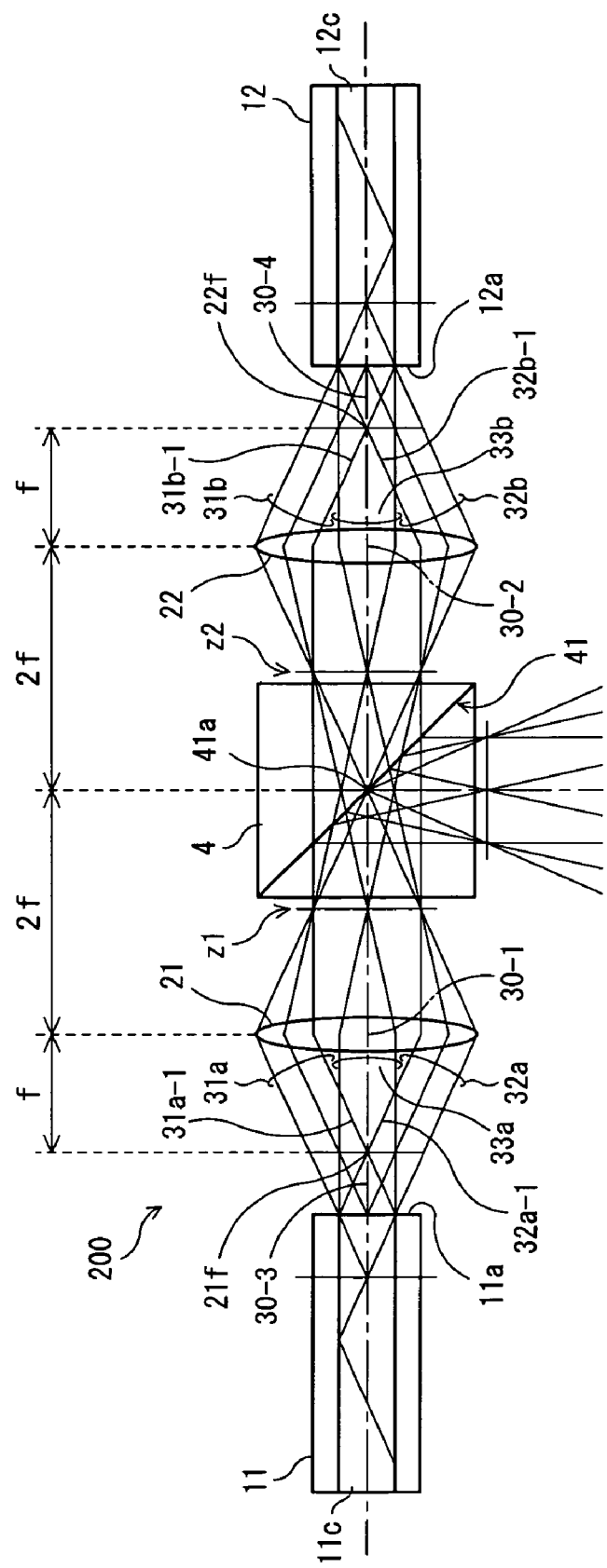
FIG. 1 is a view illustrating an optical fiber device according to a first embodiment of the present invention.

[A1-1] The Configuration of an Optical Fiber Device 200 According to the First Embodiment FIG. 1 is a view illustrating an optical fiber device 200 according to the first embodiment of the present invention. The optical fiber device 200 illustrated in FIG. 1 is configured to include a first multi-mode optical fiber 11, a second multi-mode optical fiber 12, a first condenser lens 21, a second condenser lens 22 and a half mirror 4 and can function as an optical branch device which guides light from the first multi-mode optical fiber 11 or the second multi-mode optical fiber 12 to the opposed second multi-mode optical fiber 12 or the opposed first multi-mode optical fiber 11, respectively, and cause a part of the light to branch off into a different light path.

The first multi-mode optical fiber 11 and the second multi-mode optical fiber 12 have substantially the same core diameter and substantially the same numerical aperture (NA) and are arranged such that their end faces 11a, 12a are opposed to each other. The end faces 11a, 12a of the first multi-mode optical fiber 11 and the second multi-mode optical fiber 12 are optically coupled to each other through the first condenser lens 21, the second condenser lens 22 and the half mirror 4 which are interposed therebetween.

The first and second condenser lenses 21 have the same focal length value f. The first condenser lenses 21 is arranged at the first multi-mode optical fiber 11 side and the second condenser lenses 22 is arranged at the second multi-mode optical fiber 12 side.

Further, the half mirror (mirror member) 4 is interposed, as another optical member, between the first and second condenser lenses 21, 22 and is configured as a branch mirror having a light-reflecting surface 41 which passes a part of incident light from the first multi-mode optical fiber 11 or the second multi-mode optical fiber 12 and reflects the remaining part to cause it to branch off.

In the optical fiber device 200 according to the first embodiment, since there is provided with a characteristic relationship in terms of arrangement according to the present invention as described later the aforementioned first and second multi-mode optical fibers 11, 12 and the first and second condenser lenses 21, 22, the distance between the first condenser lenses 21, 22 can be made larger than in prior arts while the multi-mode optical fibers 11, 12 are coupled to each other with a low loss.

Namely, the first condenser lens 21 and the second condenser lens 22 are arranged between the end faces 11a, 12a of the first and second multi-mode optical fibers 11, 12 such that they are spaced apart from each other by about four times the aforementioned their same focal length f and the optical center axis 30-1 of the first condenser lens 21 and the optical center axis 30-2 of the second condenser lens 22 are put into substantially coincidence with each other.

Further, the half mirror 4 is arranged such that the intersection point 41a of the reflecting surface 41 and the aforementioned optical center axes 30-1, 30-2 which are put into coincidence with each other is at the middle point between first and second condenser lenses 21, 22 (the point at a distance of 2f from the respective lenses 21, 22). Namely, they are arranged at such positions that the distance between the first condenser lens 21 (or the second condenser lens 22) and the intersection point of the optical center axis 30-1 (30-2) of the first condenser lens 21 (the second condenser lens 22) and the light-reflecting surface 41 of the half mirror 4 is substantially twice (2f) the focal length f.

Further, the first multi-mode optical fiber 11 is arranged at the side of the first condenser lens 21 opposite to the side at which the second condenser lens 22 is arranged such that it is spaced apart from the first condenser lens 21 by a distance larger than the focal length f and the center axis 30-3 of light emitted from the first multi-mode optical fiber 11 is substantially put into coincidence with the optical center axis 30-1 of the first condenser lens 21.

Similarly, the second multi-mode optical fiber 12 is arranged at the side of the second condenser lens 22 opposite to the side at which the first condenser lens 21 is arranged such that it is spaced apart from the second condenser lens 22 by a distance larger than the focal length f and the center axis 30-4 of light emitted from the second multi-mode optical fiber 12 is substantially put into coincidence with the optical center axis 30-2 of the second condenser lens 22.

Figure 2:
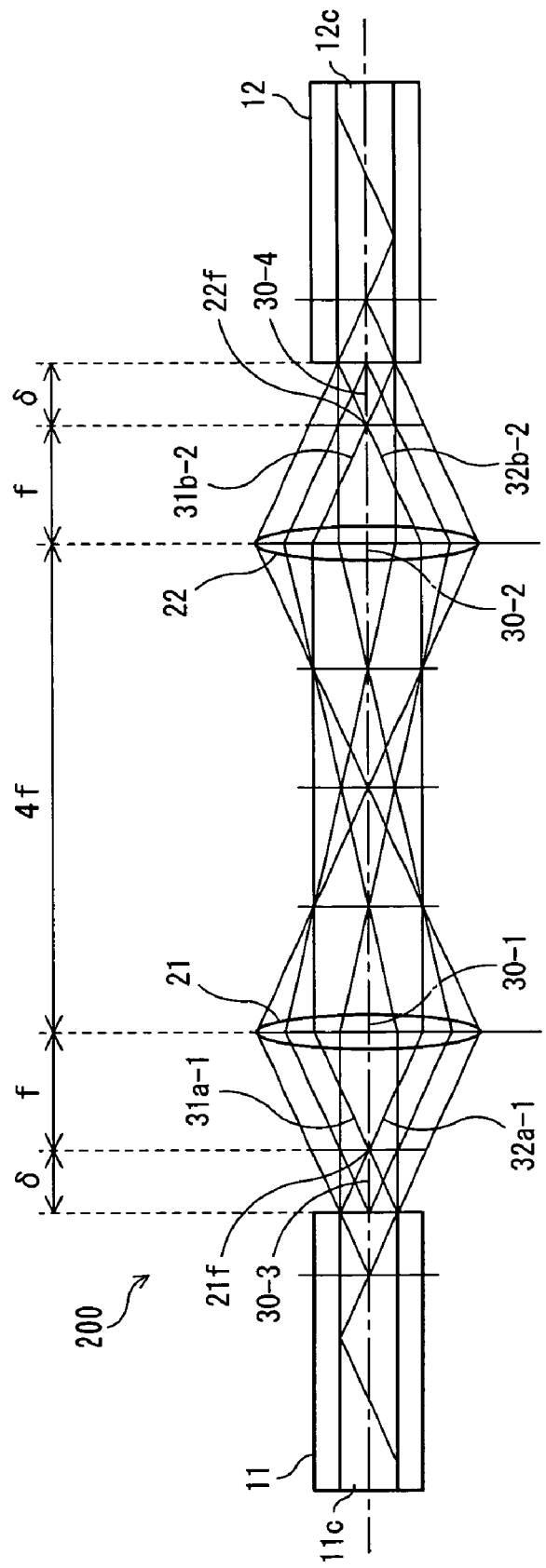
FIG. 2 is a view emphatically illustrating the loci of light beams emitted from the first and second multi-mode optical fibers according to the first embodiment of the present invention.

FIG. 2 is a view illustrating and focusing attention on the paths of light beams emitted from the aforementioned first and second multi-mode optical fibers 11, 12, wherein representation of the half mirror 4 is omitted. In FIG. 2, as light beams emitted from the first multi-mode optical fiber 11, there are illustrated the loci of light beams 31a, 32a emitted from the uppermost position, the middle position and the lowermost position of the core 11c with a largest tilt angle and the loci of light beams 33a emitted from the uppermost position and the lowermost position of the core 11c in parallel with the optical center axis 30-3. Further, as light beams emitted from the second multi-mode optical fiber 12, there are illustrated the loci of light beams 31b to 33b corresponding to the aforementioned light beams 31a to 33a emitted from the first multi-mode optical fiber 11.

As previously described, the first and second multi-mode optical fibers 11, 12 are adapted such that their end faces 11a, 12a are spaced apart from the first and second condenser lenses 21, 22 respectively by a distance greater than the focal length, and the distance by which the first and second multi-mode optical fibers are spaced apart from the positions at the focal length distance from the first and second condenser lenses respectively may be set to be substantially in conformity with a value determined depending on the core radius rc and the numerical aperture NA of the first and second multi-core optical fibers 11, 12, as will be described later.

Namely, the distance by which the end face 11a is spaced apart from the first condenser lens 21 is set such that the light beams 31a-1, 32a-1 proceeding or traveling from the outermost perimeter of the core 11c of the first multi-mode optical fiber 11 toward the optical center axis 30-3 of the first multi-mode optical fiber 11 and having a largest tilt angle with respect to the optical center axis 30-3 of the first multi-mode optical fiber 11, among the aforementioned light beams 31a, 32a emitted from the end face 11a, substantially pass through the position of the focal point 21f of the first condenser lens 21 between the first multi-mode optical fiber 11 and the first condenser lens 21.

Similarly, the distance by which the end face 12a is spaced apart from the second condenser lens 22 is set such that the light beams 31b-1, 32b-1 proceeding from the outermost perimeter of the core 12c of the second multi-mode optical fiber 12 toward the optical center axis 30-4 of the second multi-mode optical fiber 12 and having a largest tilt angle with respect to the optical center axis 30-4 of the second multi-mode optical fiber 12, among the aforementioned light beams 31b, 32b emitted from the end face 12a, substantially pass through the focal point 22f of the second condenser lens 22 between the second multi-mode optical fiber 12 and the second condenser lens 22.

Figure 3:
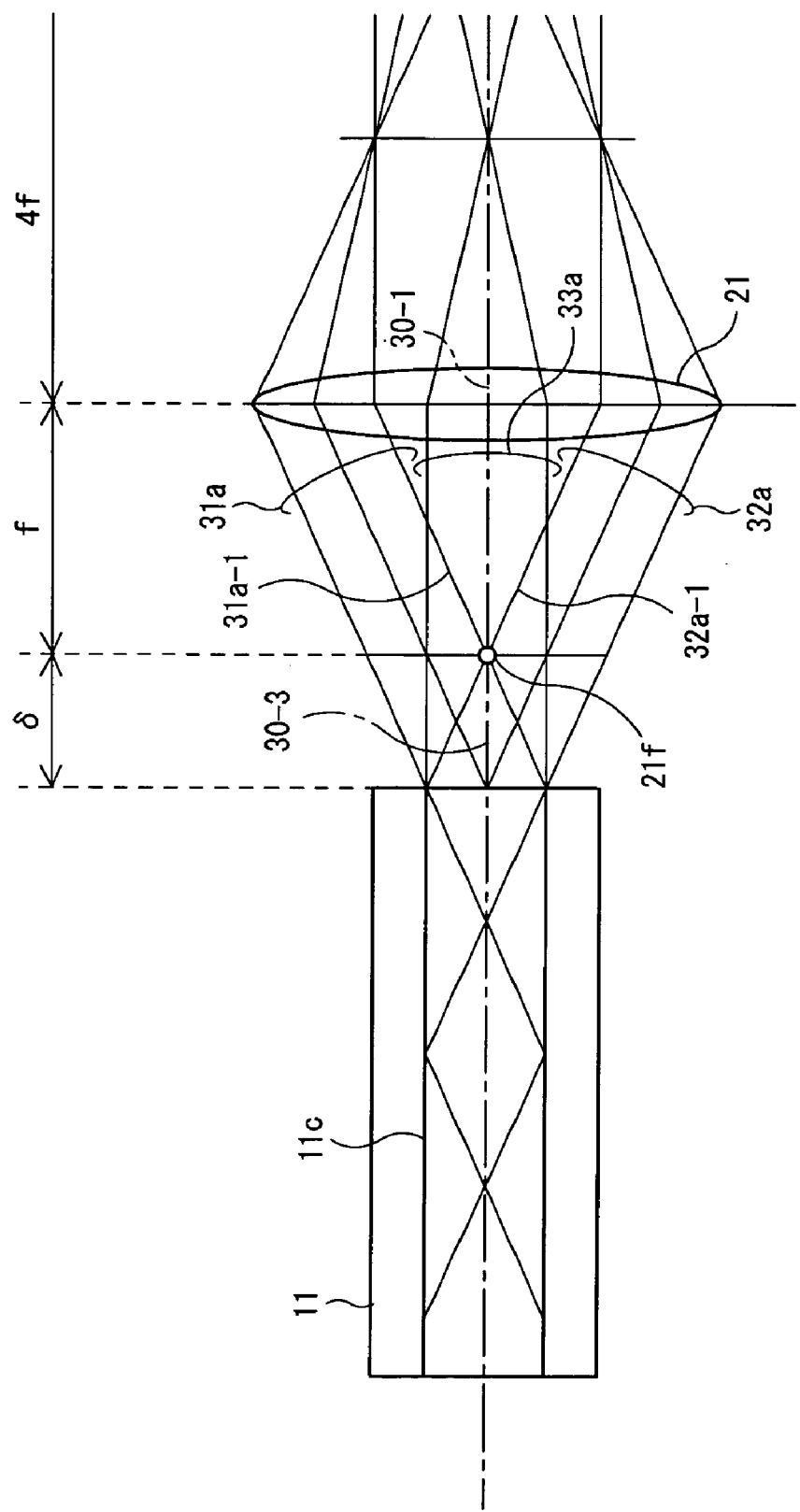
FIG. 3 and FIG. 4 are views emphatically illustrating the loci of light beams emitted from the first multi-mode optical fiber according to the first embodiment of the present invention.

FIG. 3 is a view illustrating and focusing attention on the loci of light beams emitted from the aforementioned first multi-mode optical fiber 11. As illustrated in FIG. 3, the distance between the end face 11a and the first condenser lens 21 is f+$\delta$, wherein the distance by which the end face 11a is spaced apart from the position at the focal length f distance from the first condenser lens 21 is defined as $\delta$. Similarly, the distance between the end face 12a and the second condenser lens 22 is f+$\delta$.

In other words, $\delta$ is adjusted such that light 31a-1 emitted downwardly from the uppermost end of the core 11c of the first multi-mode optical fiber 11 with a steepest angle and light 32a-1 emitted upwardly from the lowermost end of the core 11c with a steepest angle pass through the focal point 21f of the first condenser lens 21.

Thus, on focusing attention on the light beams 31a to 33a emitted from the first multi-mode optical fiber 11, any of the light beams 31a to 33a can be injected into the core 12c of the second multi-mode optical fiber 12 and the largest tilt angle of the incident beams can be made equal to the largest output angle of light beams emitted from the first multi-mode optical fiber 11. Therefore, when the first and second multi-mode optical fiber 11, 12 are optically coupled, it is made possible to realize optical coupling with a low connection loss.

Further, by setting the aforementioned $\delta$ such that the light beams 31a-1, 32a-1 (31b-1, 32b-1) pass through the focal point 21f (22f), optical coupling without theoretically any loss can be realized, as previously described, and this $\delta$ can be expressed as follows.

Figure 4:
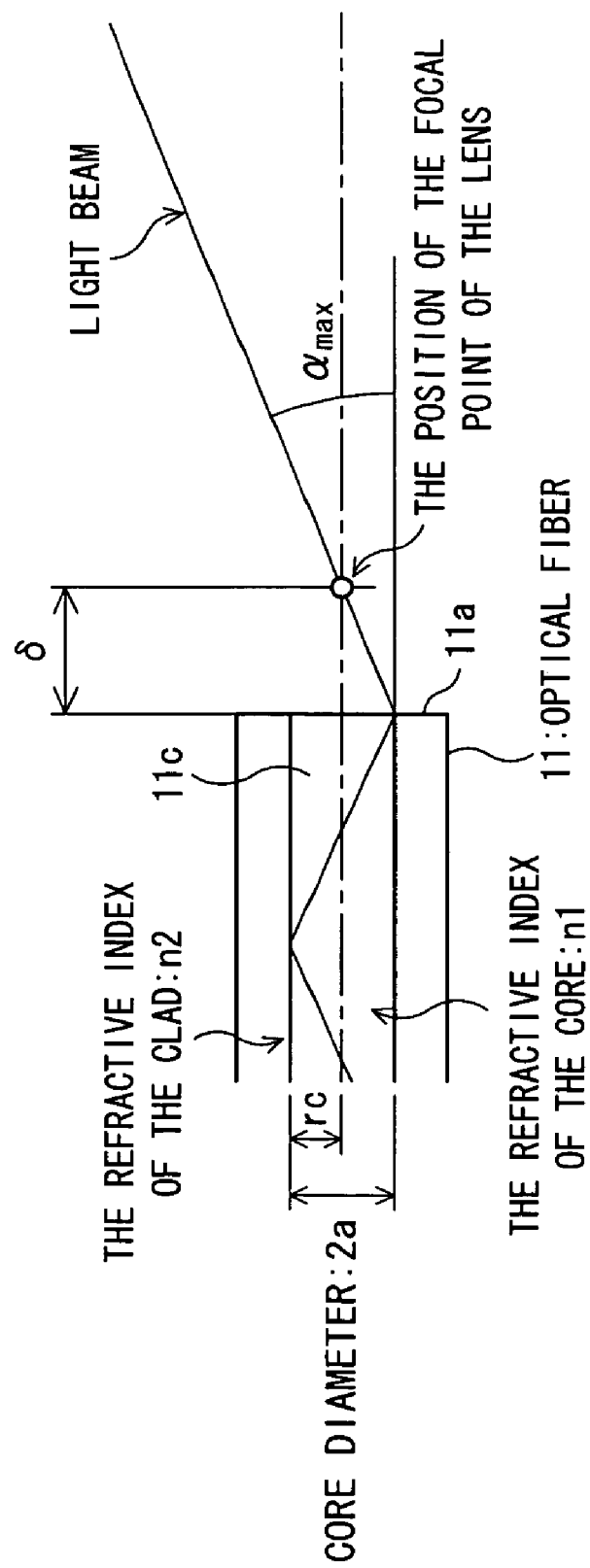

Namely, as illustrated in FIG. 4, the largest output angle a max of light emitted from the first (second) multi-mode optical fiber 11 (12) can be expressed as in the following equation (1), wherein the refractive index of the core of the first (second) multi-mode optical fiber 11 (12) is defined as n1, the refractive index of the clad is defined as n2, and the core radius is defined as rc. Further, the $\delta$ 1 can be expressed as in the equation (2) based on FIG. 4 and the $\delta$ can also be expressed as in the equation (4) using the equation (2) since the numerical aperture NA of the first (second) multi-mode optical fiber 11(12) is expressed as in the equation (3). Further, when the δ is expressed using the refractive indexes n1, n2 of the core and the clad, it is expressed as in the equation (5).

$$\alpha\ \max = \arcsin\left(\sqrt{(n1)^2 - (n2)^2}\right) \quad (1)$$

$$\delta = \frac{rc}{\tan(\alpha\ \max)} \quad (2)$$

$$NA = \sin(\alpha\ \max) = \sqrt{(n1)^2 - (n2)^2} \quad (3)$$

$$\delta = \frac{rc}{\tan\{\arcsin(NA)\}} \quad (4)$$

$$\delta = \frac{rc}{\tan\left\{\arcsin\left(\sqrt{(n1)^2 - (n2)^2}\right)\right\}} \quad (5)$$

[A1-2] Specific Exemplary Design of the Optical Fiber Device 200

Next, specific exemplary design of the optical fiber device 200 according to the first embodiment will be described.

First, each of the first and second multi-mode optical fibers 11, 12 is constituted by a step-index type multi-mode optical fiber having a core diameter of about 50 micro meters and an NA of about 0.2 and each of the first and second condenser lenses 21, 22 is constituted by a convex lens having an opening diameter of about 2.5 mm and a focal length of about 4.9 mm. Further, the half mirror 4 has an opening of 2.5 mm.

Here, the distance between the first and second condenser lenses 21, 22 is set to about 19.6 mm, which is about four times the focal length of the first and second condenser lenses 21, 22. Further, the distance between the first condenser lens 21 and the first multi-mode optical fiber 11 and the distance between the second condenser lens 22 and the second multi-mode optical fiber 12 are the focal length plus δ. Theoretical value of δ determined from the aforementioned equation (4) is about 122.5 micrometers.

Figure 5:
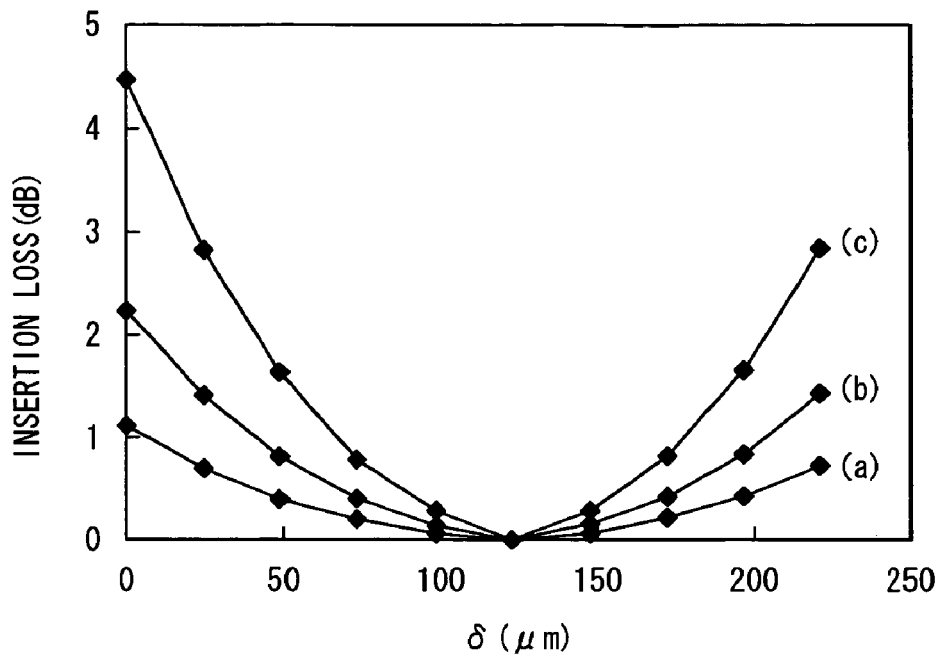
FIG. 5 illustrates the relationship between the value of $\delta$ and the insertion loss according to the first embodiment of the present invention.

FIG. 5 illustrates the relation between the value of δ and the insertion loss. FIG. 5(*a*) illustrates the loss in a single coupling system for the first and second multi-mode optical fibers 11, 12 as the optical fiber device 200 illustrated in FIG. 2, and (b) and (c) illustrate the insertion losses in two coupling systems and four coupling systems, respectively. As illustrated in FIGS. 5(*a*) to (*c*), the loss decreases with increasing δ for a δ-range of from 0 to 122.5 micrometers and the loss increases with increasing δ for a δ-range of from 122.5 micrometers.

The case where the distance of δ is 122.5 micrometers is exemplified in FIG. 3. This corresponds to the case where the light 31*a*-1 (31*b*-1) emitted downwardly from the uppermost end of the core 11*c*(12*c*) with a steepest angle and the light 32*a*-1 (31*b*-2) emitted upwardly from the lowermost end of the core 11*c*(12*c*) with a steepest angle pass through the focal point 21*f* of the first condenser lens 21 (the second condenser lens 22). In this case, a lowest loss can be obtained.

[A1-3] Description of Effects and Advantages of the Optical Fiber Device 200 According to the First Embodiment With the optical fiber device 200 configured as described above, light from the first multi-mode optical fiber 11 can be guided to the second multi-mode optical fiber 12 with a low loss, and light from the second multi-mode optical fiber 12 can be guided to the first multi-mode optical fiber 11 with a low loss.

While the first and second multi-mode optical fibers 11, 12 are optically coupled to each other with a low loss as previously described, the first and second condenser lenses 21, 22 interposed between the first and second multi-mode optical fibers 11, 12 are arranged such that they are spaced apart from each other by about four times the focal length. Therefore, it is made easier to interpose other optical members between the first and second condenser lenses 21, 22, as compared with the prior art [FIG. 21(*b*)] for interconnecting multi-mode optical fibers. Namely, depending on the distance between the first and second condenser lenses 21, 22 spaced apart from each other to a greater extent than in the prior art, it is made possible to improve the selectivity of the size of optical members to be interposed between the first and second condenser lenses 21, 22.

Particularly, by providing the half mirror 4 as in the first embodiment, it is made possible to configure an optical branch device which directs light from one of the first multi-mode optical fiber 21 and the second multi-mode optical fiber 22 to the other opposed multi-mode optical fiber with a low loss and also causes a part of the light to branch off into a different path.

Further, with the aforementioned prior art [FIG. 21(*b*)] for interconnecting multi-mode optical fibers, if an attempt would be made to interpose a half mirror between the condenser lenses 121, 122, light could not be injected to the half mirror at a position where the beam diameter thereof is reduced as in the first embodiment due to the restriction on the distance between the condenser lenses 121, 122, and therefore it is required to employ a half mirror having an opening size larger than that in the first embodiment. In this case, in association with the restriction on the distance between the condenser lenses 121, 122, it will become further difficult to interpose a half mirror between the lenses 121, 122.

On the contrary, with the optical fiber device 200 according to the first embodiment, when it is designed according to the aspect of, for example, the aforementioned [A1-2], a light beam emitted from the first condenser lens 21 towards the second condenser lens 22 will have a beam diameter of about 2 mm at a position z1 spaced apart from the first condenser lens 21 by about the focal length f towards the second condenser lens 22. Similarly, a light beam emitted from the second condenser lens 22 towards the first condenser lens 21 will have a beam diameter of about 2 mm at a position z2 spaced apart from the second condenser lens 22 by about the focal length f towards the first condenser lens 21.

Therefore, at the positions z1, z2 between the first and second condenser lenses 21, 22, the beam diameter is relatively reduced as compared with that of light just after emitted from the first and second condenser lenses, and therefore the size of the half mirror 4 intended to be interposed can be reduced corresponding to the reduction of the beam diameter of light injected into the opening. This makes it easier to interpose the half mirror 4 between the first and second condenser lenses 21, 22. The distance between z1 and z2 is about 9.8 mm, which is substantially twice the focal length of the first and second condenser lenses 21, 22.

Further, by optimizing δ involved in the focal length f plus δ which is the distance by which the first and second multi-mode optical fibers 11, 12 are spaced apart from the first and second condenser lenses respectively as previously described, un-coupled mode components can be reduced, thereby providing an effect of noise reduction on occasion of mode changes in light propagated through the first and second multi-mode optical fibers 11, 12.

Figure 25:
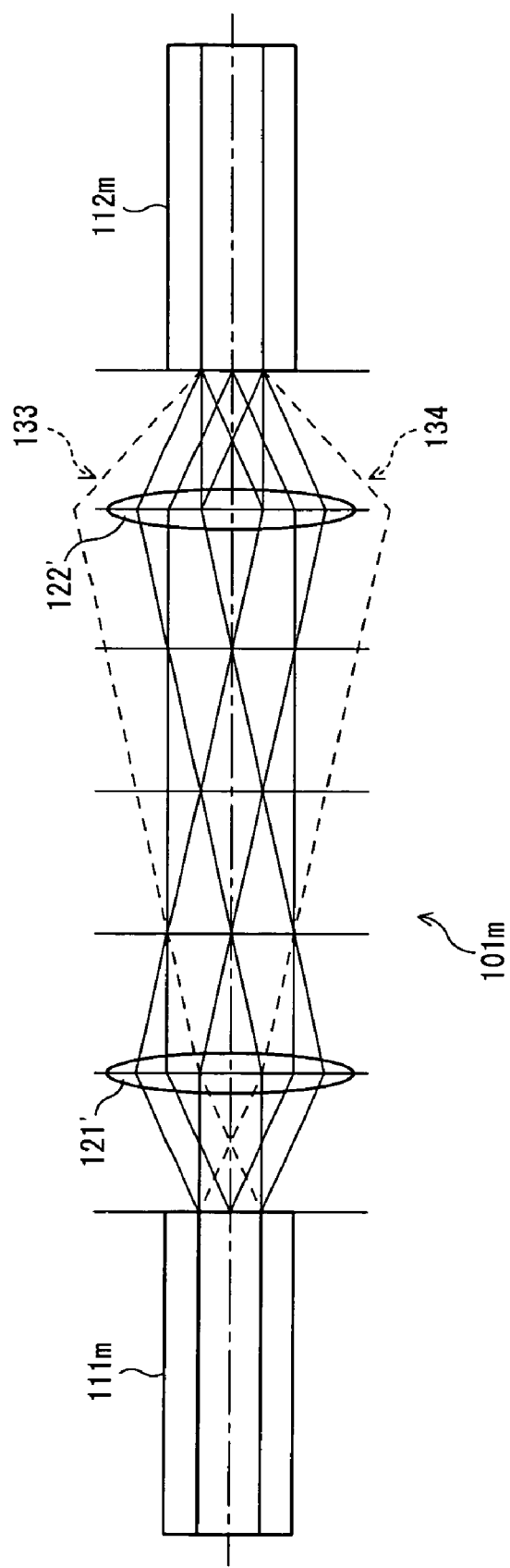

For example, in the aforementioned lens coupling system 101m illustrated in FIG. 25, the modes corresponding to the light rays 133, 134 are not coupled. The mode of light propagated through the multi-mode optical fibers 111, 112 changes with time depending on the condition of the light source which is not shown and the condition of the multi-mode optical fibers 111, 112 (environmental changes or vibrations of the fibers, etc.). At this time, if the modes corresponding to the light rays 133, 134 repeatedly occur and disappear, the coupling power decreases when the modes occur and increases when the modes disappear, resulting in time-varying power, which leads to noise.

Figure 6:
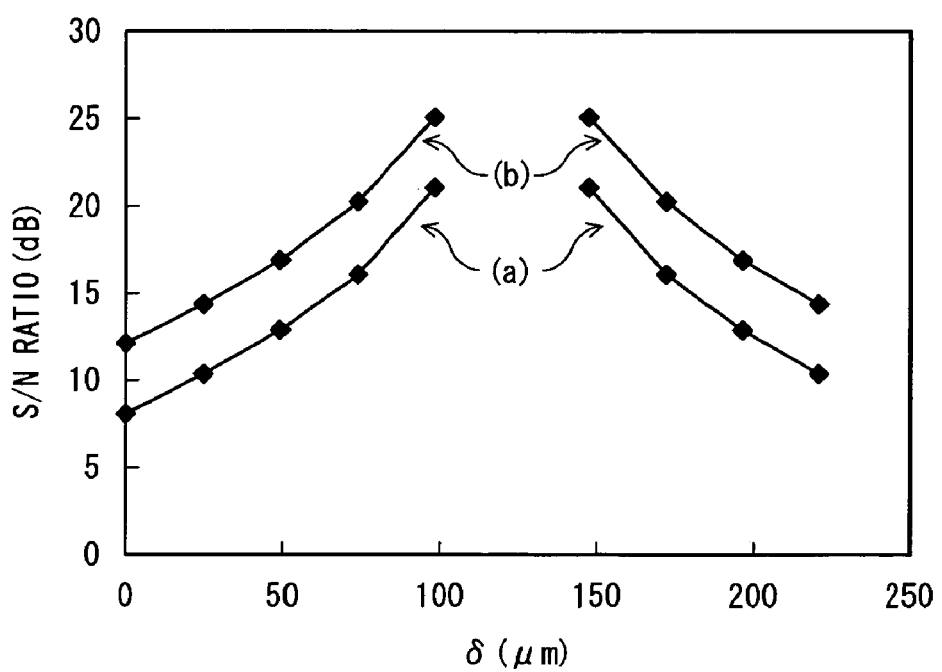
FIG. 6 illustrates an exemplary calculation of the change in the SN ratio attributed to uncoupled modes, depending on $\delta$ according to the first embodiment of the present invention.

In the case where there are many uncoupled modes, it is necessary that these modes are subjected to statistical processing since all the modes do not repeatedly occur and disappear with the same timing. FIG. 6 illustrates an exemplary calculation of the change in the SN ratio attributed to uncoupled modes, depending on the aforementioned δ, in the case where a lens coupling system is configured using fist and second multi-mode optical fibers 11, 12 and first and second condenser lenses 21, 22, similar to those employed in the aforementioned [A1-2].

In FIG. 6, (a) illustrates cases where it is assumed that 50% of the uncoupled modes leads to noise and (b) illustrates cases where it is assumed that 20% of the uncoupled modes become noise. Thus, in either case, there is attained an effect that the SN ratio is improved as δ approaches 122.5 micrometers.

As described above, with the optical fiber device 200 according to the first embodiment of the present invention, the first and second condenser lenses 21, 22 are arranged such that they are spaced apart from each other by substantially four times the focal length and their optical center axes are substantially put into coincidence with each other. The first multi-mode optical fiber 11 is arranged such that it is spaced apart from the first condenser lens 21 by a distance larger than the focal length and the center axis of light emitted from the end face 11a of the first multi-mode optical fiber 11 is substantially put into coincidence with the optical center axis of the first condenser lens 21. The second multi-mode optical fiber 12 is arranged such that it is spaced apart from the second condenser lens 22 by a distance larger than the focal length and the center axis of light emitted from the end face 12a of the second multi-mode optical fiber 12 is substantially put into coincidence with the optical center axis of the second condenser lens 21. Therefore, when the first and second multi-mode optical fibers 11, 12 are optically coupled to each other, it is made possible to realize optical coupling with a low connection loss and low noise.

Further, as compared with the lens optical system of the prior art [see FIG. 21(b)], the distance between the first and second condenser lenses 21, 22 can be increased, thereby making it easier to interpose other optical members between the first and second condenser lenses 21, 22. Thereby there can be attained an advantage that the applicability in designing the lens optical system can be improved.

Further, by providing the half mirror 4 between the first and second condenser lenses 21, 22, there is also attained an advantage that it is possible to configure an optical branch device which optically couples the first multi-mode optical fiber 21 or the second multi-mode optical fiber 22 to each other while causing a part of the light to branch off into a different path, without increasing the size of the half mirror.

While in the aforementioned first embodiment the half mirror 4 is interposed between the first and second condenser lenses 21, 22, the present invention is not limited to this and the optical system may be configured without providing other optical members between the first and second condenser lenses 21, 22 (see FIG. 2) Also, optical members other than the half mirror 4 may be provided and, for example, a mirror may be interposed as a reflective member, at a middle point between the first and second condenser lenses 21, 22, in order to configure the optical system illustrated in FIG. 2 as a reflection model.

[A2] Description of a First Exemplary Modification of the First Embodiment

Figure 7:
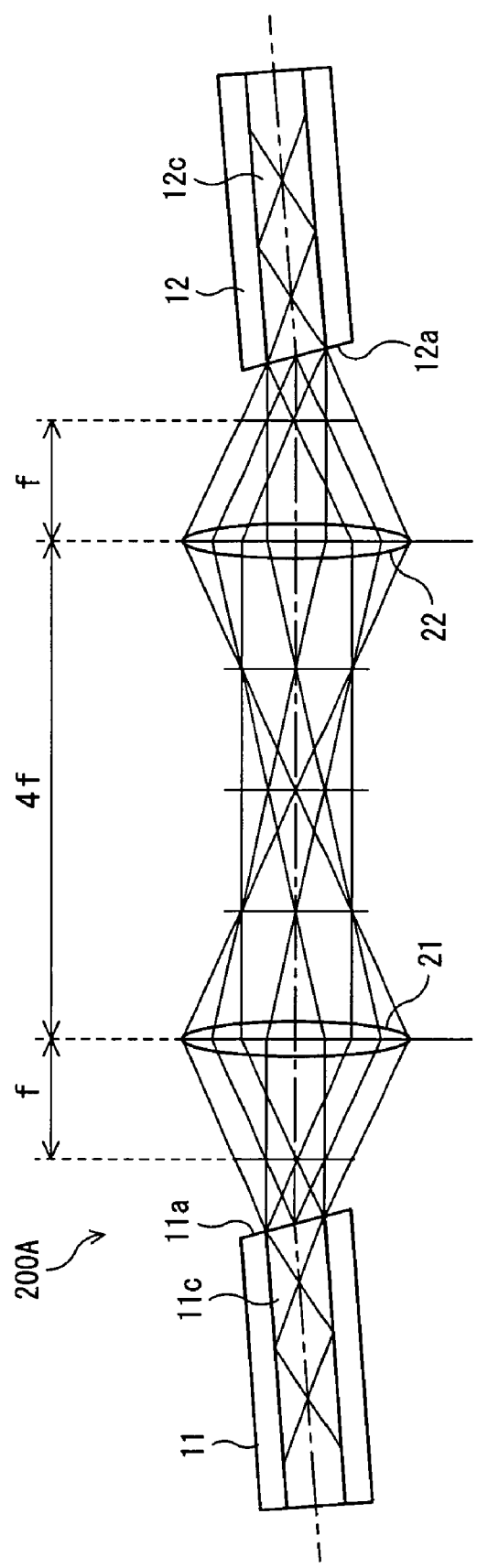
FIG. 7 is a view illustrating a first exemplary modification of the first embodiment of the present invention.

In the aforementioned first embodiment, the respective end faces 11a, 12a of the first and second multi-mode optical fibers 11, 12 may be inclined with respect to the angle perpendicular to the direction of light propagation, as an optical fiber device 200A illustrated in FIG. 7, to attain an effect of reducing the power of light reflected at the end faces 11a, 12a and then returned and coupled to the source optical fiber (back-reflected light). For example, when the end faces 11a, 12a are inclined with respect to the angle perpendicular to the direction of light propagation by an angle equal to or greater than about 8 degree, there is attained the attenuation of back-reflected-light from the end faces 11a, 12a when it is coupled to the optical fibers is made equal to or greater than about 40 dB.

[A3] Description of a Second Exemplary Modification of the First Embodiment

Figure 8:
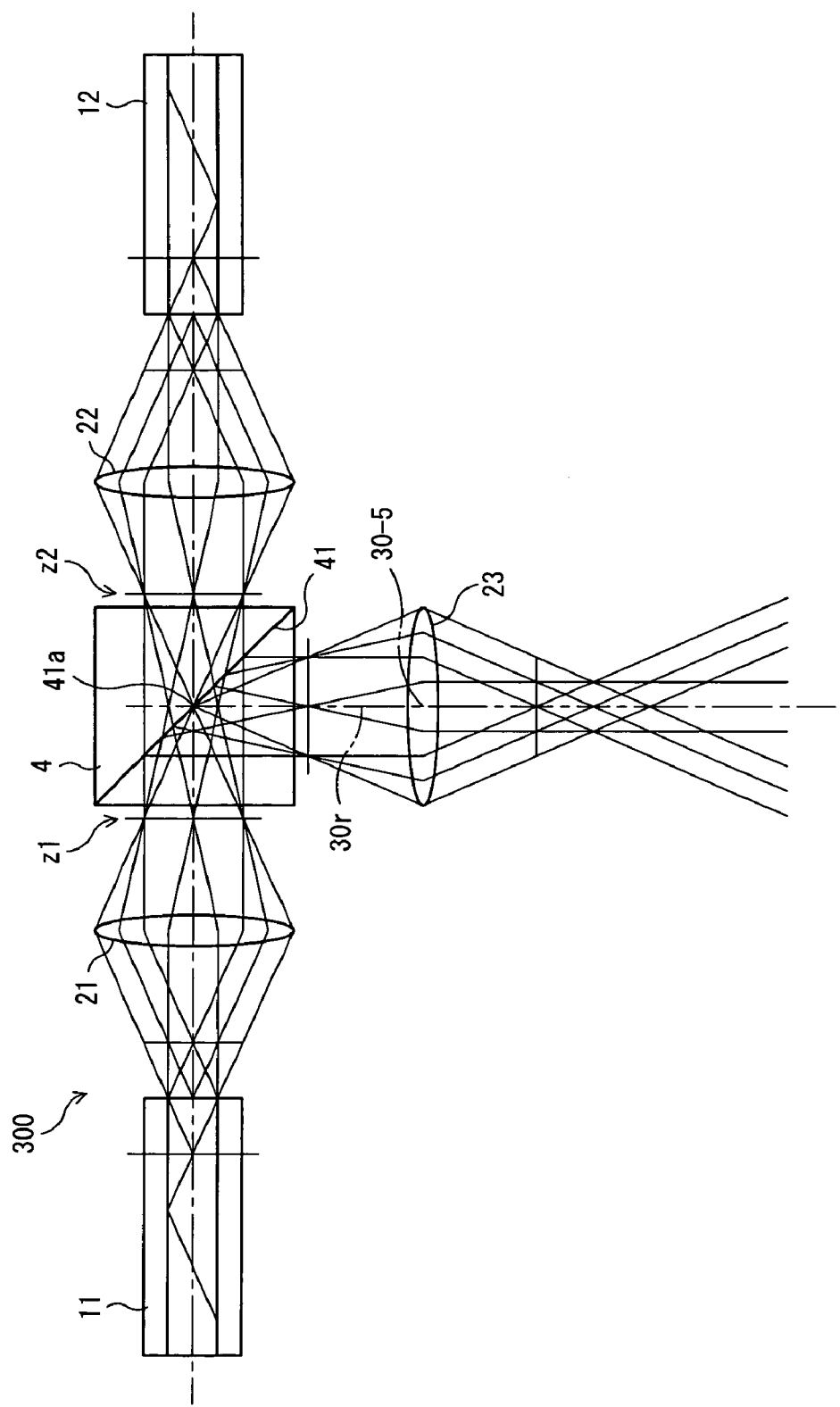
FIG. 8 is a view illustrating an optical fiber device according to a second exemplary modification of the first embodiment of the present invention.

FIG. 8 is a view illustrating an optical fiber device 300 according to the second exemplary modification of the first embodiment. The optical fiber device 300 illustrated in FIG. 8 differs from the optical fiber device 200 (see FIG. 1) according to the aforementioned first embodiment in that a third condenser lens 23 is provided, along with a half mirror 4 similar to that in the aforementioned first embodiment, as another optical member interposed between the first and second condenser lenses 21, 22. The other configurations are basically similar to those of the aforementioned first embodiment.

The third condenser lens 23 is provided on the light path of light branched by the half mirror 4 and is constituted by a convex lens having substantially the same focal length as the focal length of the first and second condenser lenses 21, 22 (see fin FIG. 1). Namely, light to be branched from the first multi-mode optical fiber 11 or the second multi-mode optical fiber 12 into a different path is reflected by the half mirror 4 and the third condenser lens 23 is arranged such that the center axis 30r of the light reflected by the half mirror 4 is put into coincidence with the optical center axis 30-5 of the third condenser lens. Further, the third condenser lens 23 is arranged such that the distance between the third condenser lens 23 and the intersection point 41a of the reflecting surface 41 and the optical center axes 30-1, 30-2 of the first and second condenser lenses 21, 22 is twice the focal length f of the third condenser lens 23.

As specific exemplary design, in addition to the configuration of the aforementioned [A1-2], the third condenser lens may be constituted by a convex lens having the same characteristics as those of the first and second condenser lenses 21, 22, namely an opening diameter of 2.5 mm and a focal length of 4.9 mm. In this case, similarly, the distance between the first and second lenses 21, 22 is set to about 19.6 mm, which is substantially four times the focal length f and the distance between the first condenser lens 21 and the first multi-mode optical fiber 11 and the distance between the second condenser lens 22 and the second multi-mode optical fiber 12 are set to the focal length f plus δ. The value of δ is preferably set to about the value designated by the aforementioned equation (4), and, in the aforementioned aspect of the design of the first and second multi-mode optical fibers 11, 12, it is desirable to set the value of δ to about 122.5 micro meters as dealt with in the aforementioned [A1-2].

With the optical fiber device 300 configured as described above, it is made possible to realize optical coupling with a low connection loss and low noise, when the first and second multi-mode optical fibers 11, 12 are optically coupled, similarly to the aforementioned first embodiment. Further, as compared with the lens optical system of the prior art [see FIG. 21(*b*)], the distance between the first and second condenser lenses 21, 22 (inter-lens distance) can be increased, thereby making it easier to interpose other optical members between the first and second condenser lenses 21, 22. Thereby there is attained an advantage that the applicability in designing the lens optical system can be improved.

[A4] Description of a Third Exemplary Modification of the First Embodiment

Figure 9:
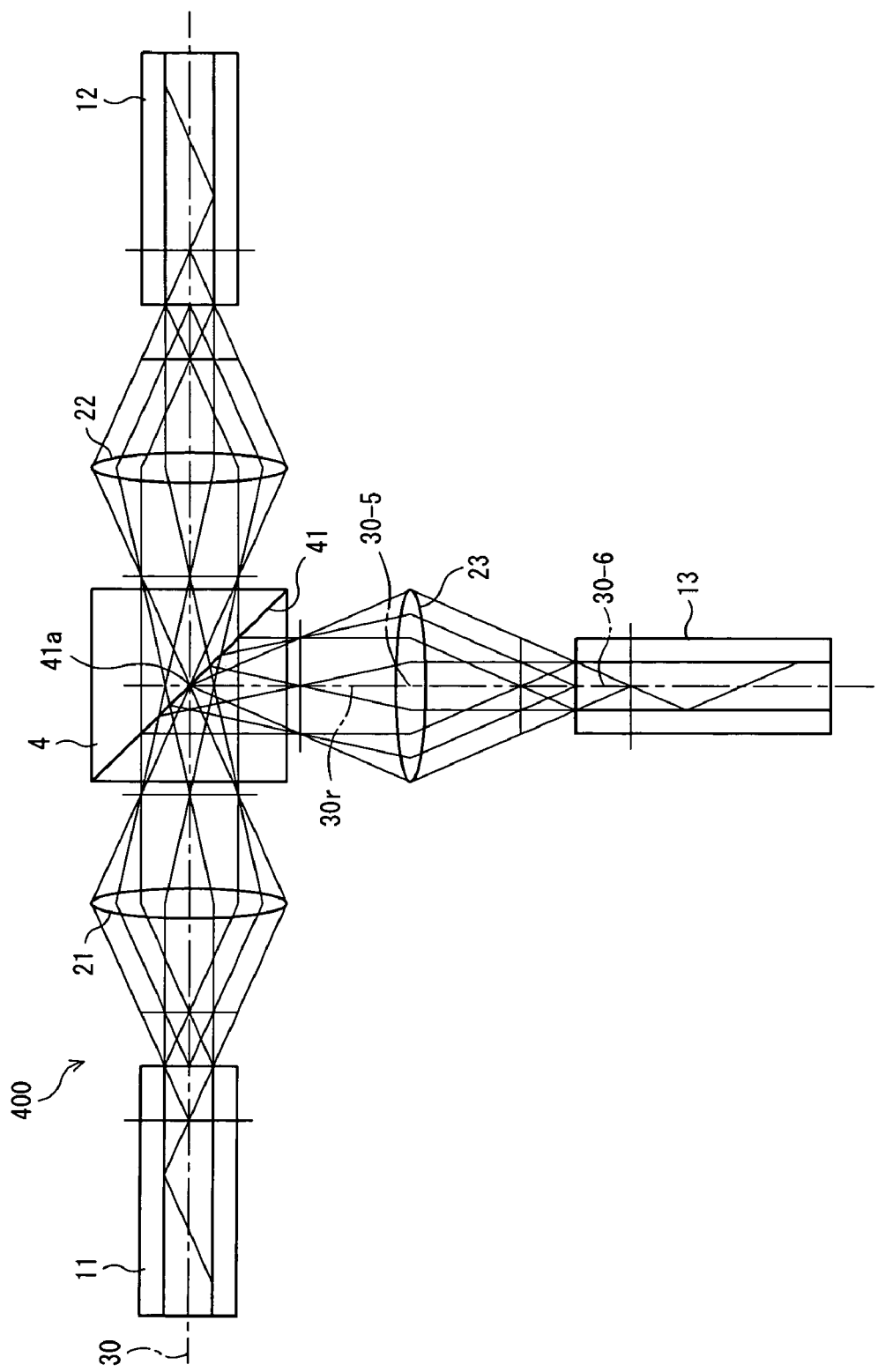
FIG. 9 is a view illustrating an optical fiber device according to a third exemplary modification of the first embodiment of the present invention.

FIG. 9 is a view illustrating an optical fiber device 400 according to the third exemplary modification of the first embodiment. The optical fiber device 400 illustrated in FIG. 9 differs from the optical fiber device 10 (see FIG. 1) according to the aforementioned first embodiment in that a third condenser lens 23 similar to that illustrated in FIG. 8 and a third multi-mode optical fiber 13 are provided along with a half mirror 4, as other optical members interposed between the first and second condenser lenses 21, 22. Configurations other than that are basically similar to those of the aforementioned first embodiment.

The third multi-mode optical fiber 13 is provided at the side of the third condenser lens 23 opposite to the side at which the half mirror 4 is arranged and has a core radius rc and a numerical aperture NA which are substantially the same as those of the first multi-mode optical fiber 11 and the second multi-mode optical fiber 12.

The third multi-mode optical fiber 13 is arranged such that it is spaced apart from the third condenser lens 23 by the focal length f plus a predetermined distance δ and the center axis 30-6 of light emitted from the aforementioned end face 13*a* of the third multi-mode optical fiber 13 is substantially put into coincidence with the optical center axis 30-5 of the third condenser lens 23.

Preferably, the predetermined distance δ by which the third multi-mode optical fiber 13 is spaced apart from the position at the focal length f distance from the third condenser lens 23 is substantially in conformity with δ designated by the aforementioned equation (4). Particularly, in the case where the third multi-mode optical fiber 13 is configured as a step-index type multi-mode optical fiber having a core diameter of about 50 micro meters and an NA of about 0.2 similarly to the first and second multi-mode optical fibers 11, 12, it is desirable that the predetermined distance δ by which the third multi-mode optical fiber 13 is spaced apart from the position at the focal length f distance from the third condenser lens 23 is set to about 122.5 micro meters, similarly to the aforementioned case of [A1-2].

With the optical fiber device 300 configured as described above, it is possible to realize optical coupling with a low connection loss and low noise when the first and second multi-mode optical fibers 11, 12 are optically coupled to each other, similarly to the aforementioned first embodiment. Further, as compared with the lens optical system of the prior art [see FIG. 21(*b*)], the distance between the first and second condenser lenses 21, 22 (inter-lens distance) can be increased, thereby making it easier to interpose other optical members between the first and second condenser lenses 21, 22. Thereby there is attained an advantage that the applicability in designing the lens optical system can be improved.

Further, since the branched light is coupled to the third multi-mode optical fiber 13, it becomes easier to route the branched light, whereby there is attained an effect that connection to optical members to be provided at the end portion opposite to the end face 13*a* of the third multi-mode fiber 13 becomes easier.

[B] Description of a Second Embodiment

Figure 10:
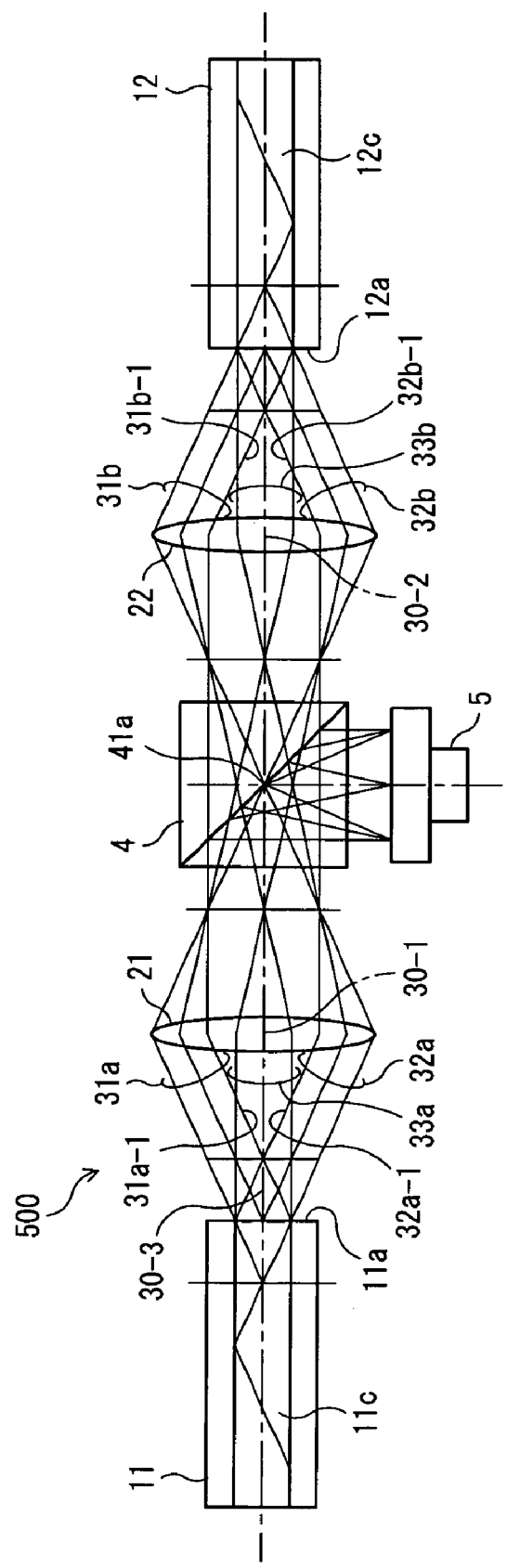
FIG. 10 is a view illustrating an optical fiber device according to a second embodiment of the present invention.

[B-1] The Configuration of an Optical Monitor 500 According to the Second Embodiment FIG. 10 is a view illustrating an optical monitor 500 according to the second embodiment of the present invention. The optical monitor 500 illustrated in FIG. 10 differs from the optical fiber device 200 (see FIG. 1) according to the aforementioned first embodiment in that there is provided a photoelectric conversion device (light monitoring section) 5 capable of photo-electrically converting light reflected by the half mirror 4, along with a half mirror 4 similar to that in the aforementioned first embodiment, as other optical members interposed between the first and second condenser lenses 21, 22, so as to configure a optical monitor. Configurations other than that are basically similar to those of the aforementioned first embodiment. In FIG. 10, the same reference numerals or symbols as those in FIG. 1 designate substantially similar components.

Namely, in the optical fiber device 500 illustrated in FIG. 10, light propagated between the first and second multi-mode optical fibers 11, 12 is monitored through the photoelectric conversion device 5. This optical monitor 500 is applicable as the in-line power monitors 81, 82 in the aforementioned optical switch 100 illustrated in FIG. 18 and FIG. 19.

Namely, when an optical switch 100 for switching a multi-mode optical fiber 112-i to be coupled to an optical fiber 111 as a multi-mode optical fiber is configured, the optical monitor 500 may be mounted to the optical fiber 111 as the in-line power monitor 81 or may be mounted to the optical fiber 112-i as the in-line power monitor 82.

For example, when it is applied as the in-line power monitor 81 in the optical switch 100, the first multi-mode optical fiber 11 is provided as the multi-mode optical fiber 111 at the side opposite to the optical fiber 112-i and the second multi-mode optical fiber 12 is provided as the multi-mode optical fiber 111 at the optical fiber 112-i side to enable monitoring light propagated through the optical fiber 111 by the photoelectric conversion device 5 and outputting the result of monitoring to the controller 116.

Also, when it is applied as the in-line power monitor 82 in the optical switch 100, the first multi-mode optical fiber 11 is provided as the multi-mode optical fiber 112-i at the optical fiber 111 side and the second multi-mode optical fiber 12 is provided as the multi-mode optical fiber 112-i at the side opposite to the optical fiber 111 to enable monitoring light propagated through the optical fiber 112-i and outputting the result of monitoring to the controller 116.

[B-2] Description of Effects and Advantages of the Optical Monitor 500 According to the Second Embodiment With the optical monitor 500 configured as described above, since the first and second multi-mode optical fibers 11, 12 are optically coupled to each other similarly to the aforementioned first embodiment, light from the first multi-mode optical fiber 11 is guided to the second multi-mode optical fiber 12 through the first condenser lens 21, the half mirror 4 and the second condenser lens 22 and a part of the light is injected to the photoelectric conversion device 5 through the half mirror 4. Similarly, light from the second multi-mode optical fiber 12 is guided to the first multi-mode optical fiber 11 through the second condenser lens 22, the half mirror 4 and the first condenser lens 21 and a part of the light is injected to the photoelectric conversion device 5 through the half mirror 4.

Since there is a relationship in terms of arrangement similar to that in the aforementioned first embodiment among the first multi-mode optical fiber 11, the first condenser lens 21, the second condenser lens 22 and the second multi-mode optical fiber 12, it is possible to realize a lens coupling system with a low loss and low noise while extracting a part of the light as light to be monitored through the photoelectric conversion device 5.

As described above, in the optical monitor 500 according to the second embodiment of the present invention, there are provided a first multi-mode optical fiber 11, a second multi-mode optical fiber 12, a first condenser lens 21, a second condenser lens 22 and a half mirror 4 which are arranged similarly to the first embodiment, and there is also provided a photoelectric conversion device 5. Therefore, there are provided effects similar to those of the aforementioned first embodiment, and in addition, there is attained an effect that monitoring of light propagated through the multi-mode optical fibers, which has been difficult with the prior arts, becomes possible.

[B-3] Exemplary Modification of the Optical Monitor 500 According to the Second Embodiment.

In the aforementioned second embodiment, the first and second multi-mode optical fibers 11, 12 may be configured such that their end faces 11a, 12a are inclined from the perpendicular to the direction of light propagation in order to reduce the reflection at the end faces, similarly to the optical fiber device 200A illustrated in FIG. 7.

Figure 11:
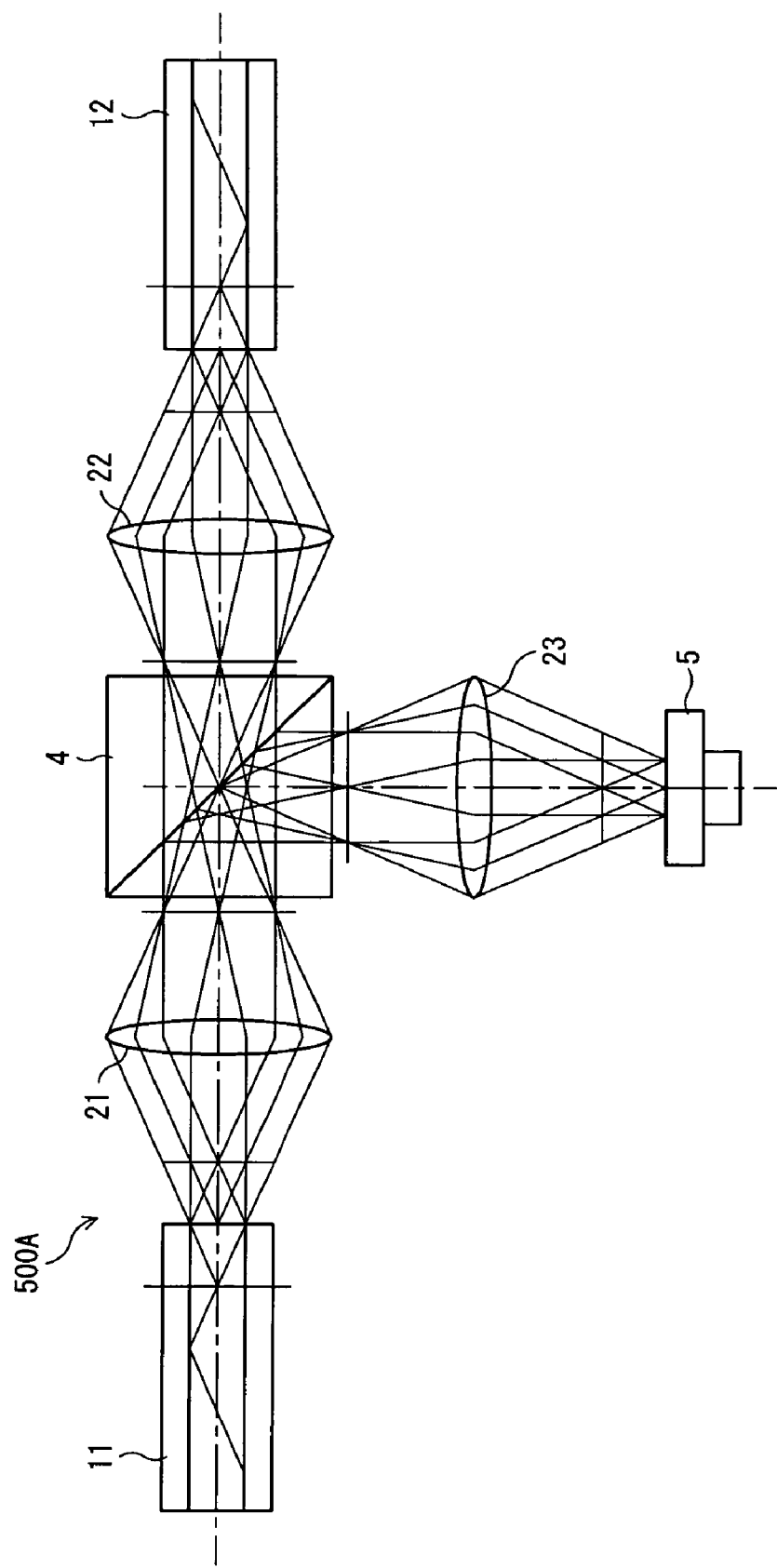
FIGS. 11 to 13 are views illustrating exemplary modifications of the second embodiment of the present invention.

Also, similarly to the optical monitor 500A illustrated in FIG. 11, the photoelectric conversion device 5 may be arranged such that it faces the third condenser lens 23 constituting the optical fiber device 300 according to the first exemplary modification of the first embodiment to monitor the branched light reflected by the half mirror 4 and then passed through the third condenser lens 23.

Figure 12:
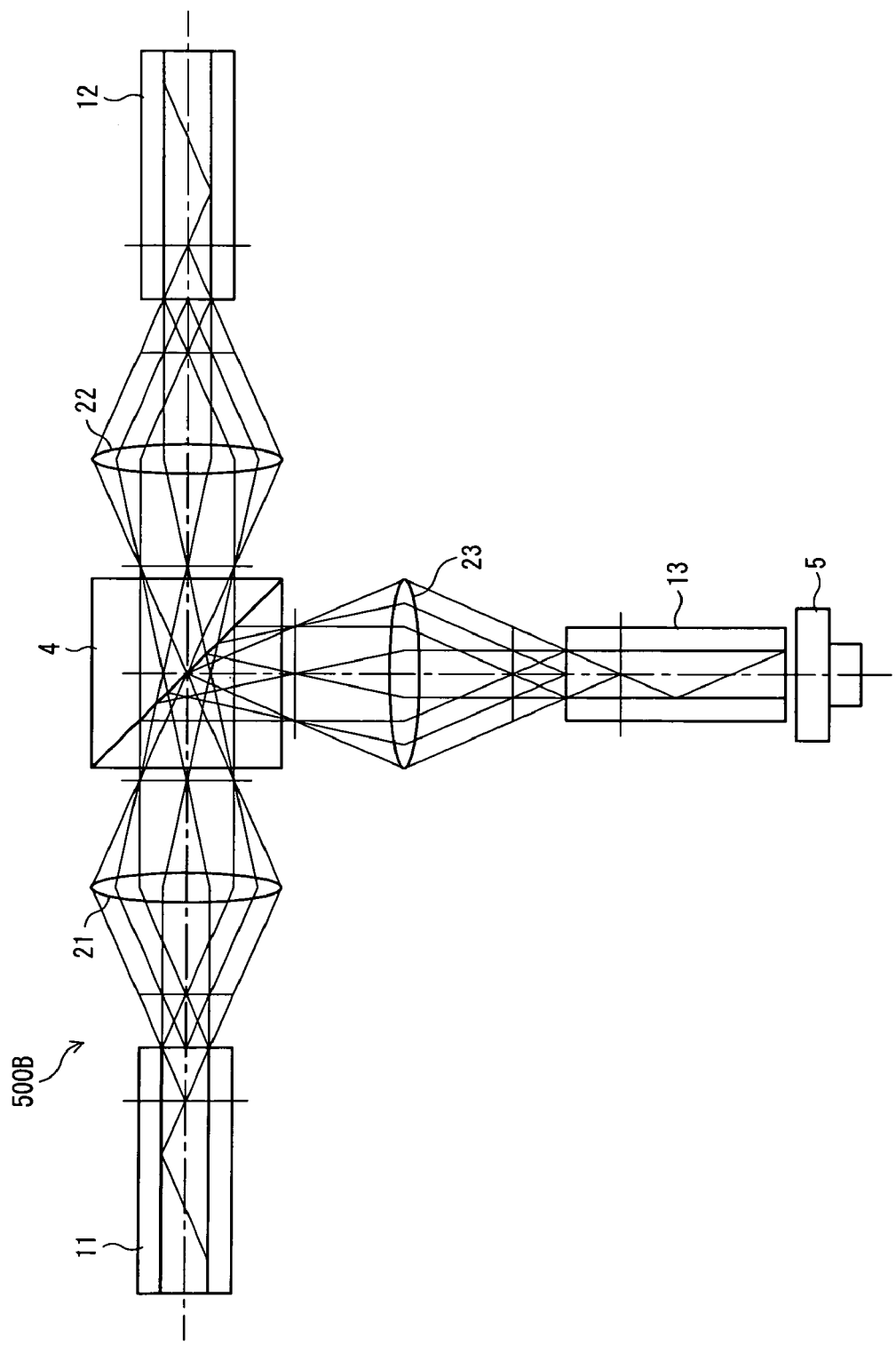

Also, similarly to the optical monitor 500B illustrated in FIG. 12, the photoelectric conversion device 5 may be arranged such that it faces the end face of the third multi-mode optical fiber 13 at the side opposite to the third condenser lens 23 to monitor the branched light reflected by the half mirror 4, then passed through the third condenser lens 23 and then propagated through the third multi-mode optical fiber 13 by the photoelectric conversion device 5, the third multi-mode optical fiber 13 constituting the optical fiber device 400 according to the second exemplary modification of the first embodiment.

Figure 13:
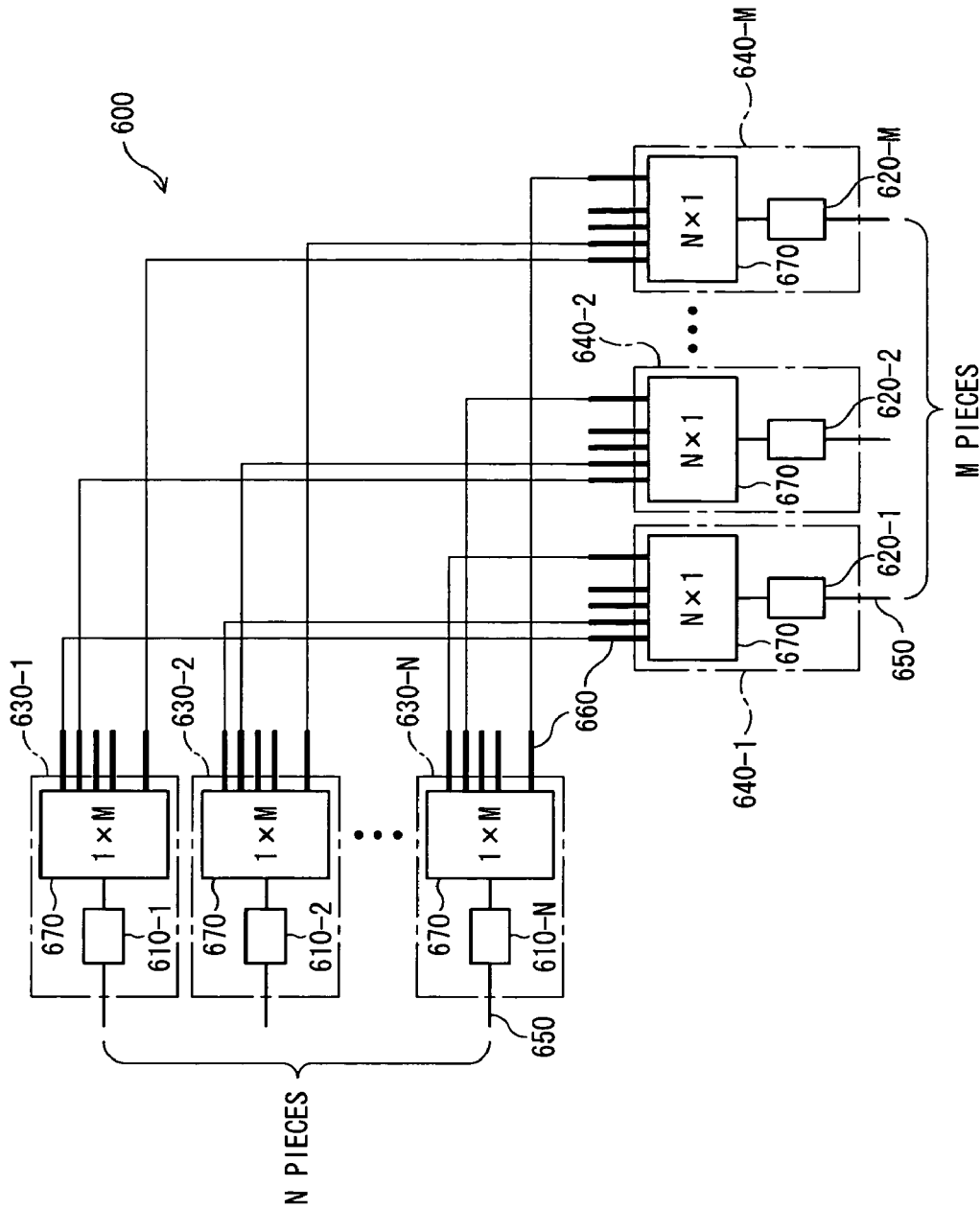

Also, the optical monitor 500 according to the aforementioned second embodiment may be configured as, for example, optical monitors 610-1 to 610-N, 620-1 to 620-M in an N×M optical switch 600 configured as illustrated in FIG. 13.

The N×M optical switch 600 illustrated in FIG. 13 is configured by combining N 1×M optical switches 630-1 to 630-N (M and N are equal to or more than 2) and M N×1 optical switches 640-1 to 640-M. In this case, the respective optical switches 630-1 to 630-N and 640-1 to 640-M are configured similarly to the aforementioned optical switch 100 illustrated in FIG. 18 and FIG. 19.

Namely, each of the optical switches 630-1 to 630-N and 640-1 to 640-M is configured to mechanically move a single port-side optical fiber (corresponding to the optical fiber 111 in FIG. 18) 650 through an actuator 670 (corresponding to the actuator 117 in FIG. 18) for selectively switching a single optical fiber to be optically coupled to the port-side optical fiber 650, among the opposed N or M optical fibers (corresponding to the optical fiber 112-i in FIG. 19) 660.

The M optical fibers 660 for each of the optical switches 630-1 to 630-N configured as described above and the N optical fibers 660 for each of the optical switches 640-1 to 640-M are distributed and connected. Namely, in the N×M optical switch 600, each one of the M optical fibers of each optical switch 630-1 to 630-N is connected to a respective one of the M optical switches 640-1 to 640-M.

Further, by applying the optical monitor 500 according to the second embodiment as optical monitors 610-1 to 610-N and 620-1 to 620-M (see the in-line power monitor 81 in FIG. 19) on the port-side optical fibers 650 of the respective optical switches 630-1 to 630-N and 640-1 to 640-M which constitute the N×M optical switch 600 configured as described above, it is possible to monitor light coupled to the port-side optical fibers 650 of the respective optical switches 630-1 to 630-N and 640-1 to 640-M.

In FIG. 13, representation of optical monitors (see the in-line power monitor 82 in FIG. 19) on the M optical fibers 660 of each of the optical switches 630-1 to 630-N and the N optical fibers 660 of each of the optical switches 640-1 to 640-M is omitted. On these optical fibers 660, the optical monitor 500 may be also mounted as optical monitors. Also, the mounting of the light monitoring sections may be actually omitted.

[C1] Description of a Third Embodiment

Figure 14:
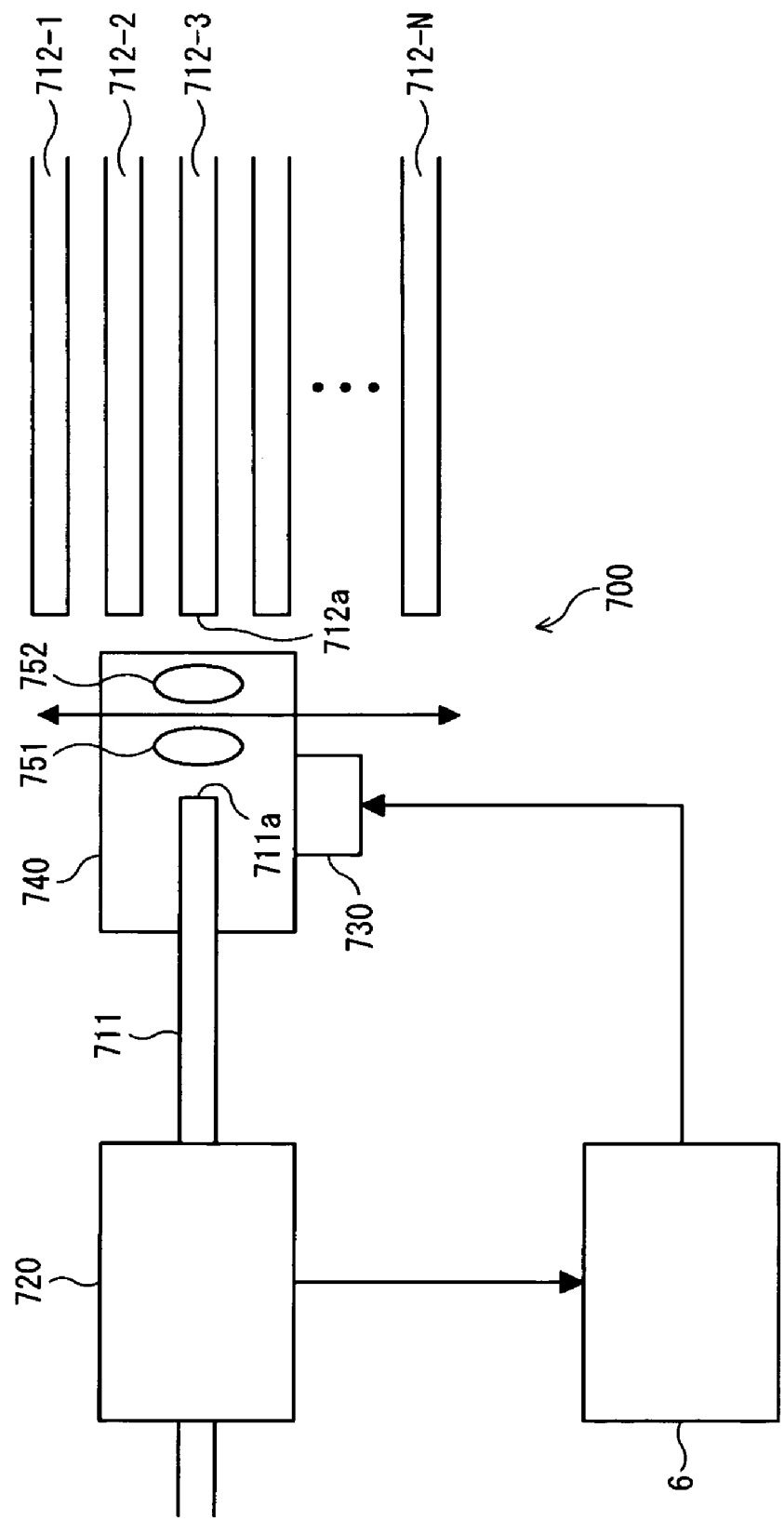
FIG. 14 is a view illustrating a 1×N optical switch according to the third embodiment of the present invention.

[C-1] The Configuration of a Optical Switch 700 According to the Third Embodiment FIG. 14 is a view illustrating a 1×N optical switch 700 according to the third embodiment of the present invention. The optical switch 700 illustrated in FIG. 14 is capable of mechanically moving a single optical fiber 711 as a switching-source multi-mode optical fiber to selectively switching a single switching-destination multi-mode optical fiber to be optically coupled to the optical fiber 711, among optical fibers 712-1 to 712-N.

The optical switch 700 according to the third embodiment is configured to include the aforementioned optical fiber 711, the plurality (N) of optical fibers 712-1 to 712-N, an optical monitor 720, a controller 6, an actuator 730, a base table 740 and lenses 751, 752.

The optical monitor 720 is mounted on the optical fiber 711 and has a configuration similar to that of the optical monitor 500 (see FIG. 10) according to the aforementioned second embodiment. The optical monitor 720 is adapted to monitor light propagated through the optical fiber 11 and output the result of monitoring to the controller 6.

The optical fibers 712-1 to 712-N are arranged in parallel such that their end faces 712a face the end face 711a of the optical fiber 711 and the positions of the end faces 712a are aligned along a straight line.

Further, a portion of the optical fiber 711 on the side of the end face 711 is secured to the base table 740 and the lenses 751, 752 as a third lens and a fourth lens are fixedly arranged on the base table 740 in this order from near the end face 711a.

The actuator 730 is capable of moving the aforementioned base table 740 linearly along the direction of alignment of the end faces 712a of the optical fibers 712-1 to 712-N. In other words, the actuator 730 moves the base table 740 such that the distance between the end face 711a and the end faces 712a of the respective optical fibers 712-1 to 712-N is maintained at a constant interval to cause a single optical fiber 712-i (in FIG. 14, the optical fiber 712-3 as an example) out of the N optical fibers 712-1 to 712-N to be optically coupled to the optical fiber 11 through the lenses 751, 752.

In the optical switch 700 according to the third embodiment, there is a relationship in terms of arrangement among the components which is substantially similar to that in the optical fiber device 200 according to the aforementioned first embodiment except the half mirror 4 (see FIG. 2), among the optical fiber 711, the lenses 751, 752, and the single optical fiber 712-i to be optically coupled to the optical fiber 711.

Namely, the lenses 751, 752 on the base table 740 have the same focal length as a second focal length and are arranged on the base table 740 such that they are spaced apart from each other by substantially four times the second focal length and their optical center axes are substantially put into coincidence with each other. In the third embodiment, the lenses 751, 752 may have either the same focal length as the focal length (the first focal length) of the first and second condenser lenses 21, 22 in the optical fiber device 500 (see FIG. 10) constituting the optical monitor 720 or a different focal length.

The end face 711a of the optical fiber 711 secured at one end to the base table 740 is arranged such that it is spaced apart from the lens 751 by a distance greater than the second focal length and the center axis of light emitted from the end face 711a of the optical fiber 711 is substantially put into coincidence with the optical center axis of the lens 751.

Further, the optical fiber 711 is arranged such that it is spaced apart from the lens 751 by the second focal length plus a predetermined distance δ and the center axis of light emitted from the end face 711a is substantially put into coincidence with the optical center axis of the lens 751.

Further, the optical fiber 712-i to be optically coupled to the optical fiber 711 is arranged in such a position that it is spaced apart from the lens 752 by the second focal length plus the predetermined distance δ and the center axis of light emitted from the end face 712a of the optical fiber 712-i is substantially put into coincidence with the optical center axis of the lens 752.

The controller 6 monitors the light coupled to the optical fiber 711 through the aforementioned optical monitor 720 and controls the actuator 730 in order to move the base table 740 to such a position that the single optical fiber 712-i to be optically coupled to the optical fiber 711 is arranged with respect to the optical fiber 711 with an optimized coupling efficiency.

[C-2] Effects and Advantages of the Optical Switch 700 According to the Third Embodiment In the optical switch 700 configured as described above, a single optical fiber 712-i among the plurality of optical fibers 712-1 to 712-N is optically coupled to the optical fiber 711 through the control of the actuator 730. Namely, light emitted from the optical fiber 711 is guided to the optical fiber 712-i through the lenses 751, 752 and light emitted from the optical fiber 712-i is guided to the optical fiber 711 through the lenses 752, 751.

Further, with the simple moving operation for moving the base table 740 along the direction of alignment of the end faces 712a of the optical fibers 712-1 to 712-N through the actuator 730, the single optical fiber 712-i to be optically coupled to the optical fiber 711 can be selectively switched. Further, since there is the characteristic relationship in terms of arrangement of the present invention among the optical fiber 711, the lenses 751, 752 and the optical fiber 712-i, it is possible to realize optical coupling with a low loss and low noise.

Further, the optical monitor 720 having a configuration of the optical fiber device 500 similar to that in the aforementioned second embodiment monitors a part of light propagated through the optical fiber 711 which is a multi-mode optical fiber with a low loss and outputs the result of monitoring to the controller 6. The controller 6 controls the actuator 730 to optimize the condition of the optical coupling between the aforementioned optical fibers 711, 712-i, based on the result of monitoring from the optical monitor 720.

Figure 18:
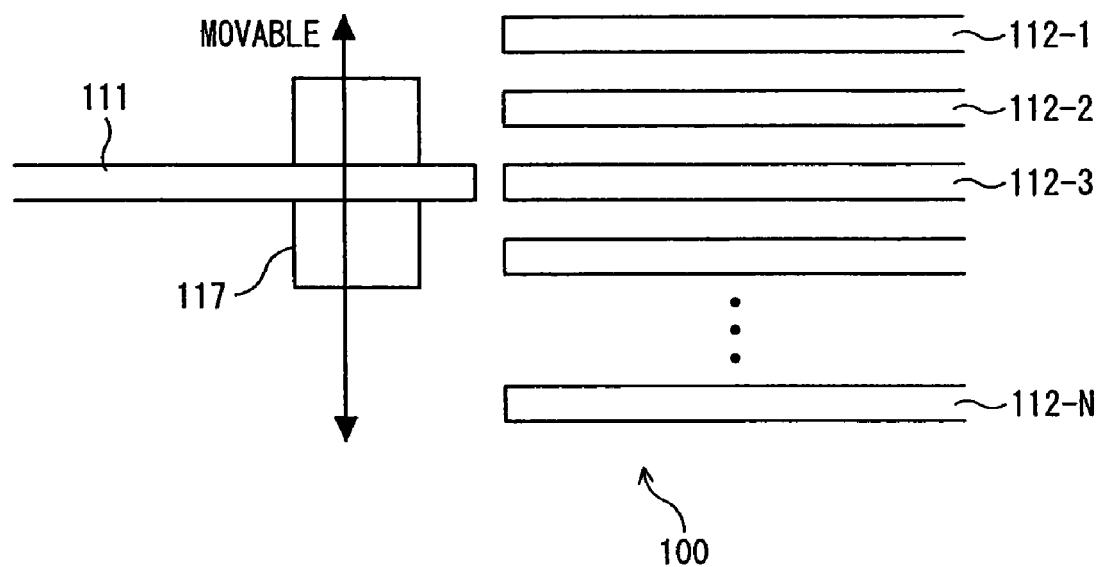
Figure 19:
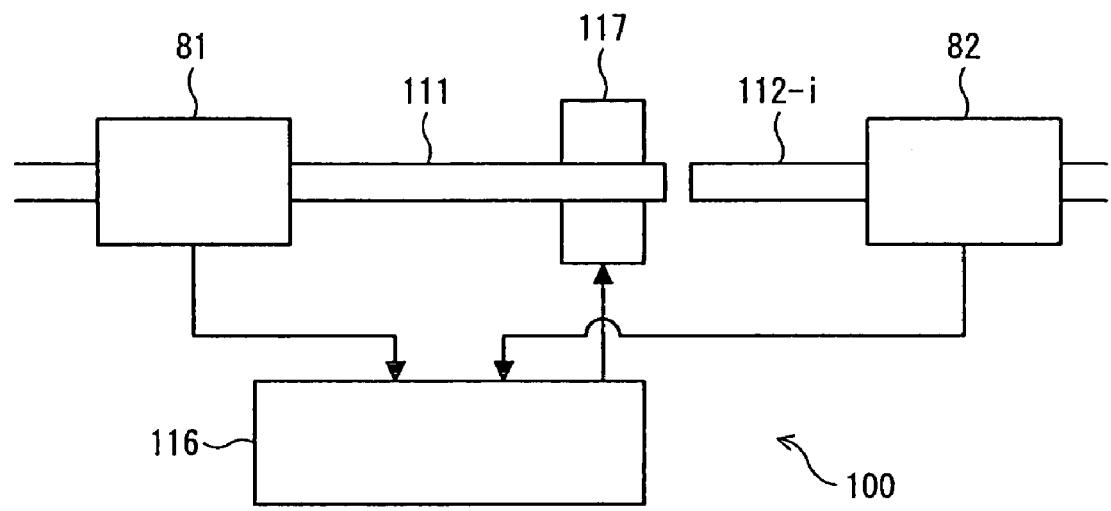
Figure 22:
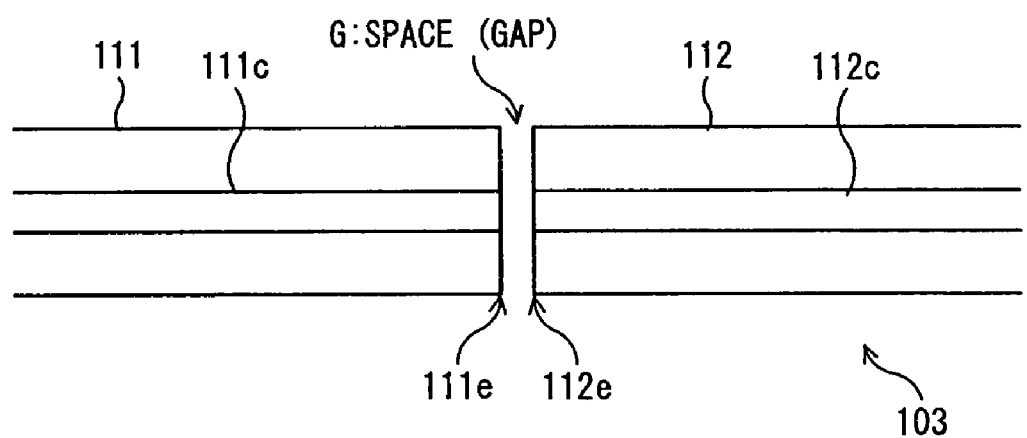
Figure 23:
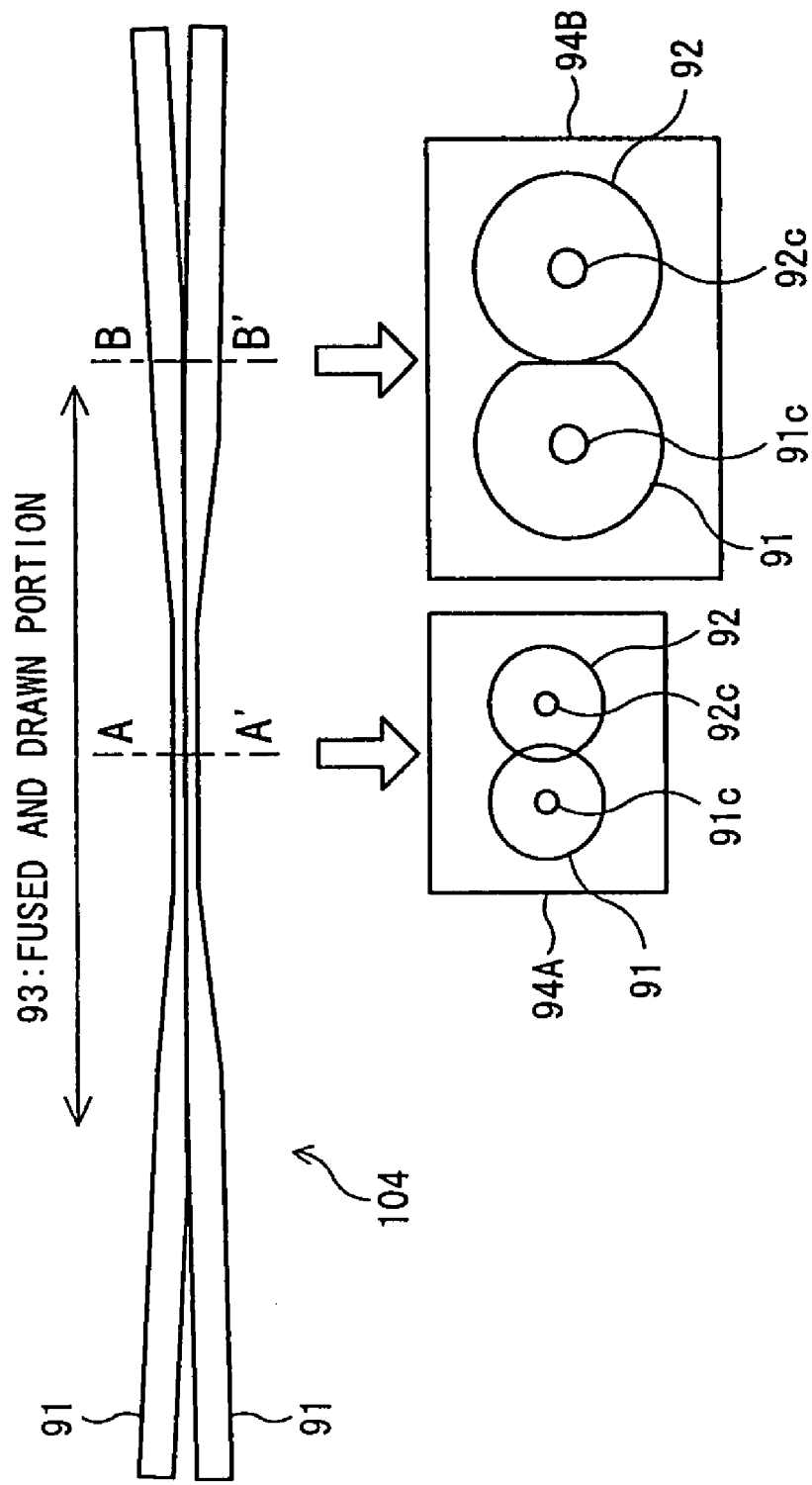
Figure 24:
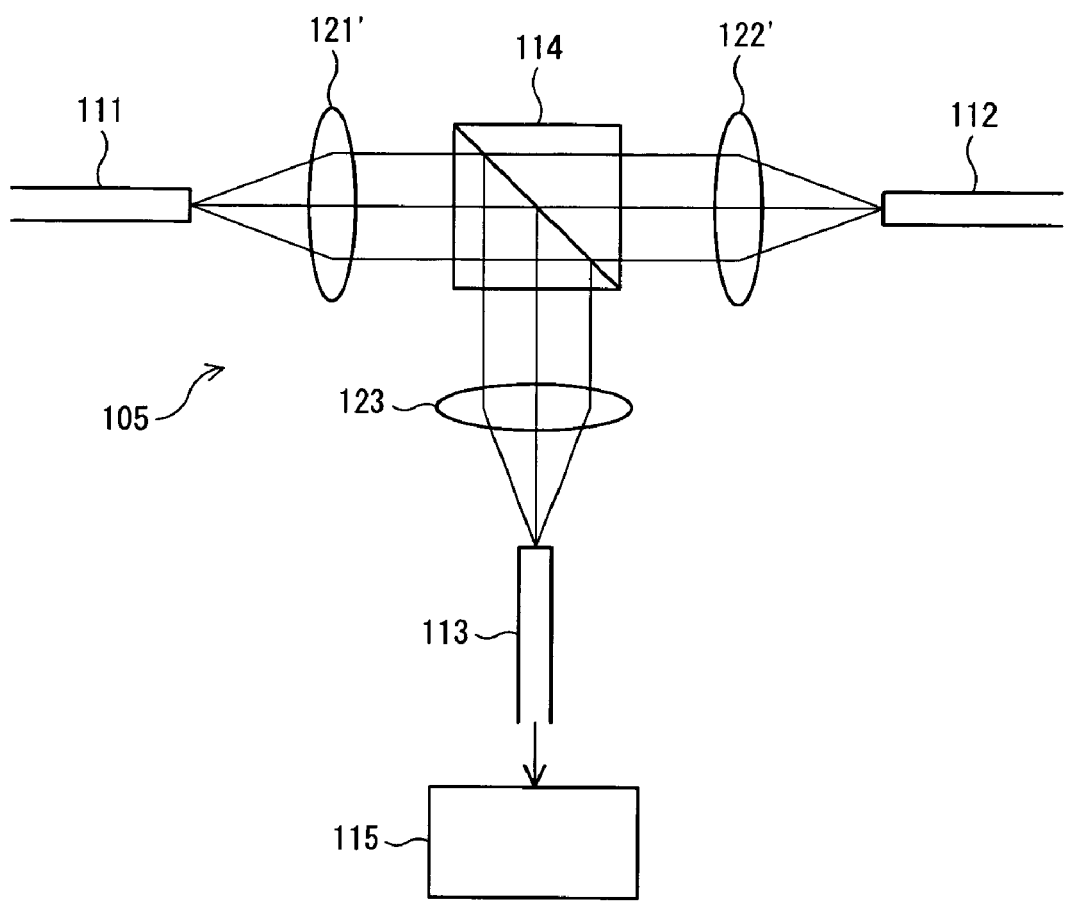
FIG. 24 and FIG. 25 are views for explaining problems to be solved by the present invention.

Even with the prior art, for example, as illustrated in FIG. 22, by butting the end faces of multi-mode optical fibers against each other, there has been a possibility of realizing a coupling system with a low loss in the event that there is no gap between the optical fibers butted against each other and there is no reflection at the end faces. However, in the case where this coupling system 103 illustrated in FIG. 22 is applied to the optical switch 100 as illustrated in FIG. 18, it is required to mechanically move the optical fiber 111 not only in the direction of alignment of the optical fibers 112-1 to 112-N but also in the direction of light axis, in order to eliminate the gap between the end faces 111e, 112e, with the result that a difficulty arises in controlling it finely in order to eliminate the gap. For example, in Laid-Open (Kokai) 2003-315702, there has been devised a method for eliminating the gap by performing an operation for moving an optical fiber in the light axis direction to push it against an optical fiber opposed thereto, in addition to an operation for moving the optical fiber in the direction parallel to the light axis to select the connection-designation optical fiber. This method, however, involves a complicated mechanism. Moreover, there is a fear that pushing the optical fiber in the light axis direction would lead to the damage of fiber end faces and there is also a fear that a decrease in the switching speed is caused by the moving operation in the two directions required for switching between fibers.

Figure 15:
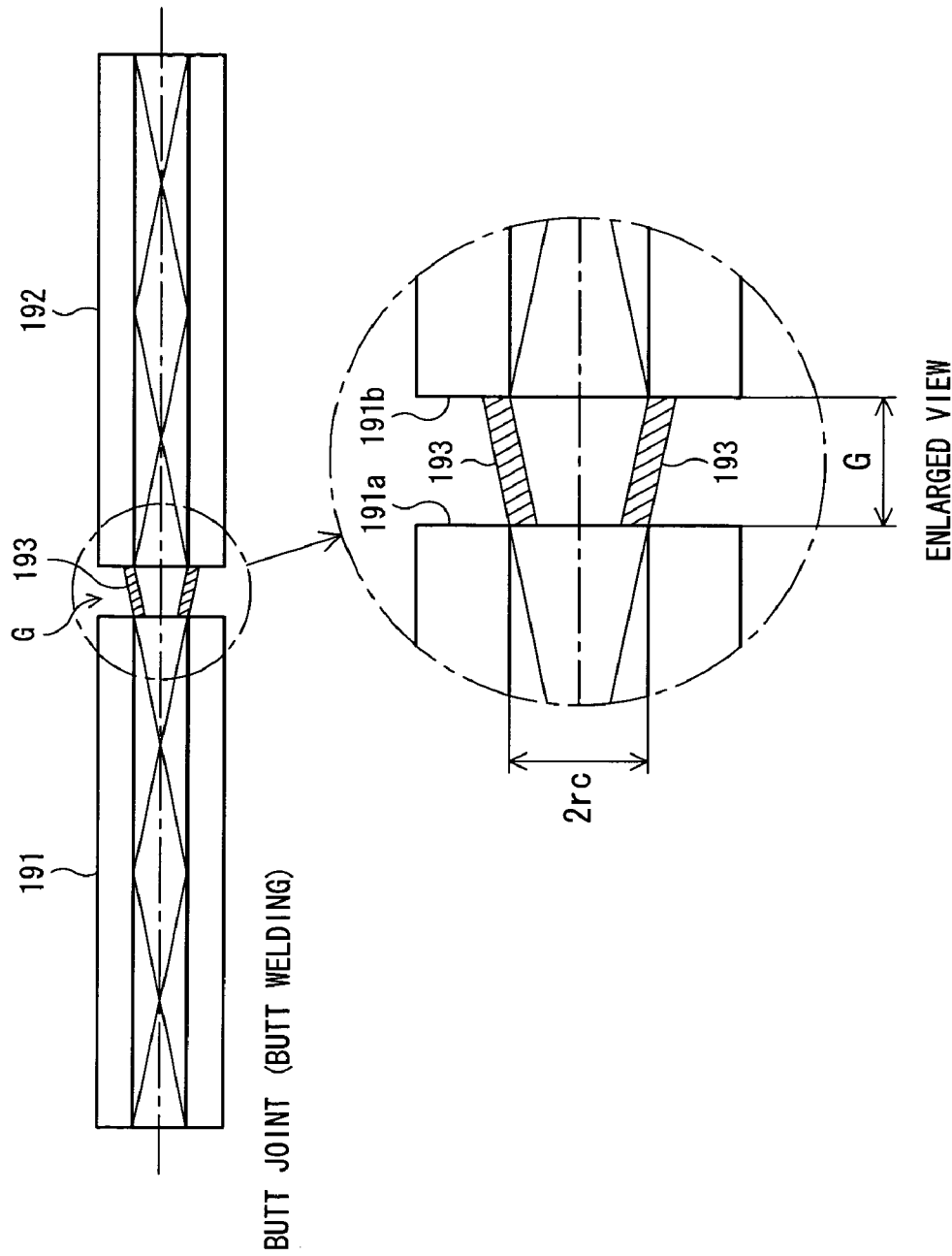
FIG. 15 is a view for explaining problems solved by the 1×N optical switch according to the third embodiment of the present invention.

Further, in view of the possibility of damage at the fiber end faces, in the case where the gap G between the opposed end faces of optical fibers cannot be eliminated and, for example, when light is propagated from the left-hand fiber 191 to the right-hand fiber 192 as exemplified in FIG. 15, the hatched portions 193 lead to losses. Further, in order to make the gap G small, it is required to set the end face 191a perpendicularly to the direction of light propagation, consequently resulting in the difficulty in attenuating back-reflected light from the optical fiber end face 191a.

On the contrary, with the optical switch 700 according to the third embodiment, it is possible to realize optical coupling with a low loss while maintaining a predetermined interval between the end faces 711a, 712a of the optical fibers 711, 712-i. Further, it is possible to rapidly switch the optical fiber 712-i to be coupled to the optical fiber 711 with a simple mechanism for moving the base table 740 in a single direction through the actuator 730.

As described above, with the optical switch 700 according to the third embodiment of the present invention, there are attained, by virtue of the optical monitor 720, effects similar to those obtained in the aforementioned second embodiment. Further, there is also attained an effect that low-loss optical coupling can be realized while a predetermined interval is maintained between the end faces 711a, 712a of the optical fibers 711, 712-i through the relationship in terms of arrangement among the optical fibers 711, 712-i and the lenses 751, 752, and, in addition, the optical fiber 712-i to be coupled to the optical fiber 711 can be rapidly and accurately switched with simple control which is control of the movement of the actuator 730 in a single direction executed by the controller 6.

Figure 16:
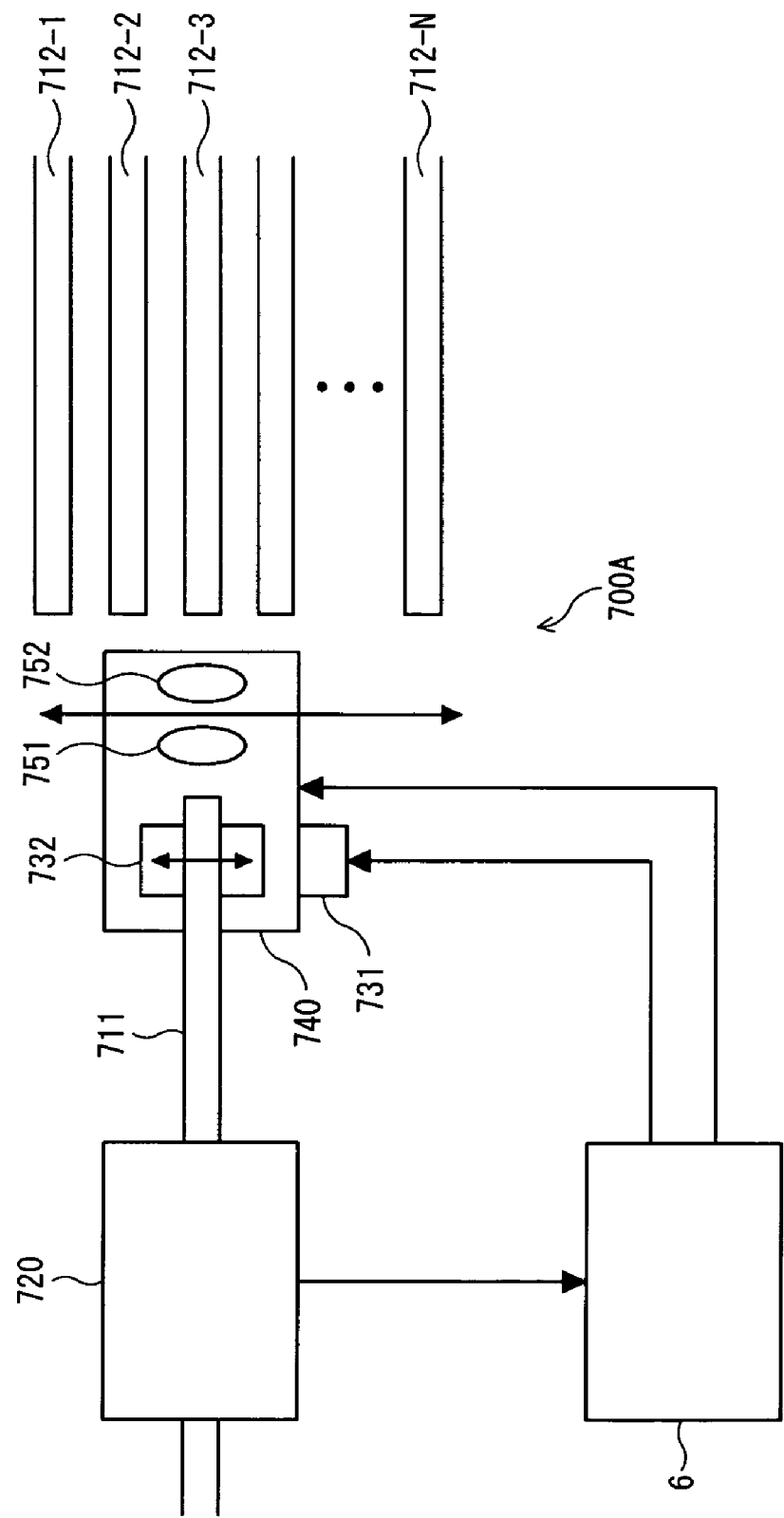
FIG. 16 is a view illustrating an exemplary modification of the third embodiment of the present invention.

While in the aforementioned optical switch 700 illustrated in FIG. 14 the actuator 730 is linearly moved along the direction of alignment of the end faces 712a of the optical fibers 712-1 to 712-N, according to the present invention, as is the case with the optical switch 700A shown in FIG. 16, the actuator 730 may be divided into a coarse-movement actuator 731 and a fine-movement actuator 732, wherein the coarse-movement actuator 731 may be used to select the optical fiber 712-i and the fine-movement actuator 732 may be used to perform fine adjustment in order to optimize the efficiency of coupling between the fibers 711, 712-i based on the result of monitoring from the optical monitor 720.

Further, by utilizing the optical switch according to the aforementioned third embodiment, it is possible, of course, to configure an N×M optical switch as illustrated in FIG. 13.

[D] Description of a Fourth Embodiment

[D-1] The Configuration of a Optical Switch According to the Fourth Embodiment

Figure 17:
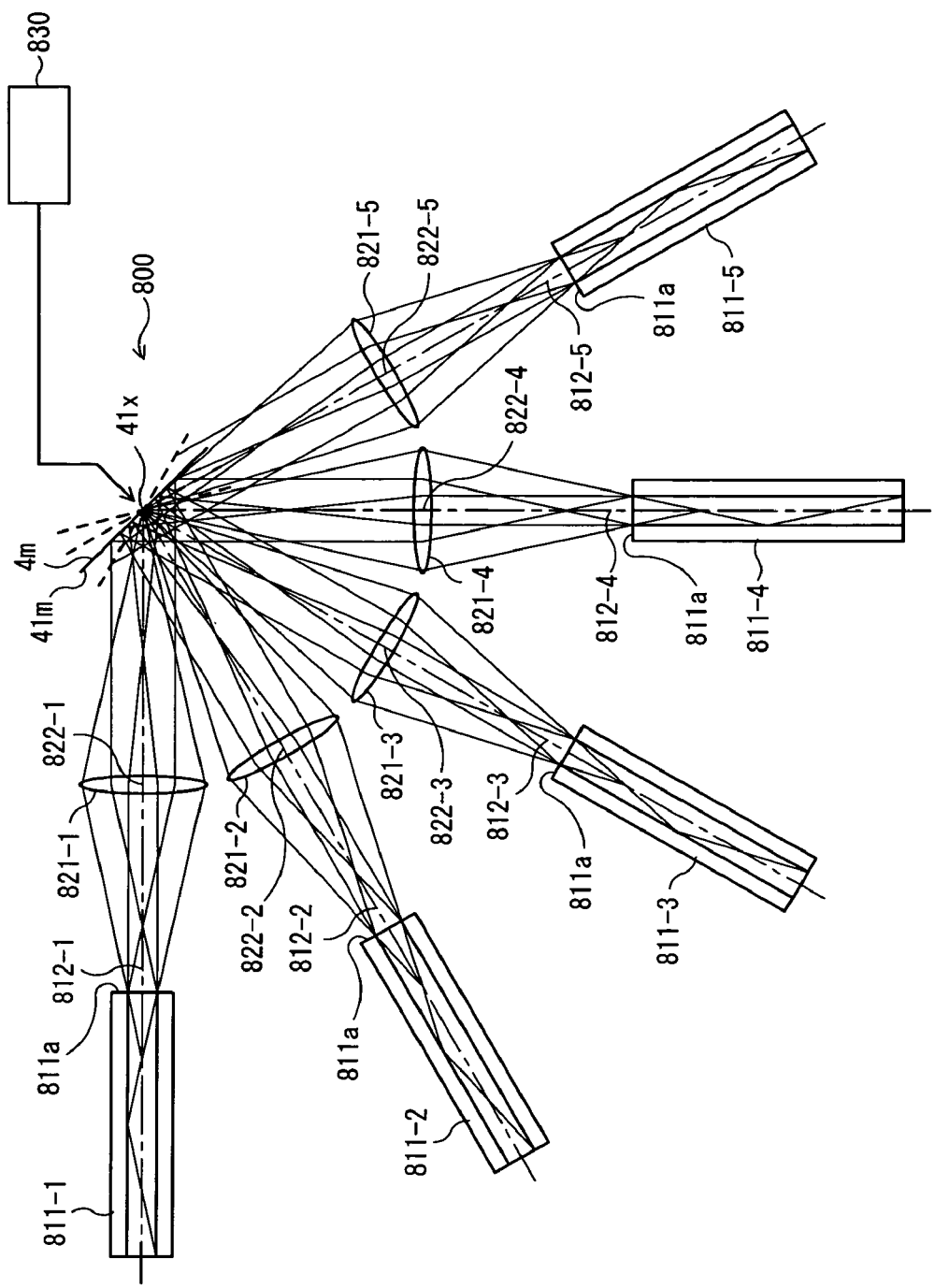
FIG. 17 is a view illustrating an optical switch according to a fourth embodiment of the present invention.

FIG. 17 is a view illustrating an optical switch 800 according to the fourth embodiment of the present invention. The optical switch 800 illustrated in FIG. 17 is configured to include multi-mode optical fibers 811-1 to 811-5, condenser lenses 821-1 to 821-5, a mirror 4m as a reflective member rotatable about a rotation axis perpendicular to the plane of the paper, and an angle switching section 830 for switching and setting the angle of the mirror 4m.

The multi-mode optical fibers 811-1 to 811-5 have substantially the same core radius rc and substantially the same numerical aperture NA. The condenser lenses 821-1 to 821-N are a plurality of lenses (five lenses in the fourth embodiment) arranged facing the respective end faces of the multi-mode optical fibers 811-1 to 811-5 and have substantially the same focal length f. The center of the light axis of each of the multi-mode optical fibers 811-1 to 811-5 (or the center axis 812-1 to 812-5 of light emitted from the end face 811a of each of the multi-mode optical fibers 811-1 to 811-5) is substantially put into coincidence with the optical center axis 822-1 to 822-5 of the corresponding condenser lens 821-1 to 821-5.

Further, the mirror 4m is capable of reflecting light emitted from the multi-mode optical fibers 811-1 to 811-5 and transmitted through the corresponding condenser lenses 821-1 to 821-5 and is configured to be rotatable about the rotation axis 41x perpendicular to the paper plane so that the angle of the reflecting surface 41m with respect to light from the respective multi-mode optical fibers 811-1 to 811-5 is variable. More specifically, the mirror 4m can be rotated such that the angle of the reflecting surface 41m illustrated by the solid line in the figure is changed over to the angles illustrated by the dot lines.

Further, the mirror 4m is capable of causing at least a pair of multi-mode optical fibers among the multi-mode optical fibers 811-1 to 811-5 to be optically coupled through the corresponding condenser lenses, according to the setting of the angle of the aforementioned reflecting surface. For example, according to the setting of the angle of the reflecting surface of the mirror 4m, the multi-mode optical fiber 811-1 and the multi-mode optical fiber 811-4 can be optically coupled to each other, as the aforementioned pair of the multi-mode optical fibers, through the condenser lens 821-1, the mirror 4m and the condenser lens 821-4.

When attention being focused on the optical system between the aforementioned pair of multi-mode optical fibers which are optically coupled to each other, the optical system is substantially configured, equivalent to the aforementioned optical system illustrated in FIG. 2 including no half mirror 4, by using the mirror 4m interposed on the light path between the first and second condenser lenses.

Further, the angle switching section 830 is capable of switching and setting the reflection angle of the mirror 4m in order to switch the pair of multi-mode optical fibers to be optically coupled to each other.

Thus, it is possible to configure a 1×N (N is two or more) optical switch capable of selecting any one of the multi-mode optical fibers 811-2 to 811-5 as a multi-mode optical fiber to be optically coupled to, for example, the multi-mode optical fiber 811-1, depending on the reflecting surface angle of the mirror 4m which is set by the angle switching section 830. Further, of course, light can be reflected back to the source optical fiber 811-1, depending on the aspect of utilization.

When arbitrary pair of multi-mode optical fibers among the aforementioned five multi-mode optical fibers 811-1 to 811-5 is optically coupled to each other, the condenser lenses and the multi-mode optical fibers included in this coupling system constitute, through the mirror 4m, an optical system substantially similar to that in the aforementioned first embodiment.

More specifically, when assuming that the pair of multi-mode optical fibers to be optically coupled to each other are, for example, the multi-mode optical fibers 811-1, 811-4, the mirror 4m and the condenser lenses 821-1, 821-4 facing the respective end faces 811a of the multi-mode optical fibers 811-1, 811-4 are arranged such that the distances between the condenser lenses 821-1, 821-4 and the intersection points of the light-reflecting surface of the mirror 4m and the optical center axes 822-1, 822-4 of the condenser lenses 821-1, 821-4 are substantially twice the aforementioned focal length f.

For example, by configuring the mirror 4m such that the intersection points of the optical center axes 822-1 to 822-5 of the condenser lenses 821-1 to 821-5 and the light-reflecting surface of the mirror 4m are substantially put into coincidence with the rotation axis 41x of the mirror 4m, an arbitrary pair of multi-mode optical fibers among the aforementioned five multi-mode optical fibers 811-1 to 811-5 can be optically coupled to each other. In this case, the respective condenser lenses 821-1 to 821-5 are arranged along an arc centered on the rotation axis of the mirror 4m and having a radius, which is twice the aforementioned focal length f.

Further, the respective condenser lenses 821-1 to 821-5 corresponding to the arbitrary pair of multi-mode optical fibers to be optically coupled to each other are arranged such that their optical center axes 822-1 to 822-5 are substantially put into coincidence with each other through the mirror 4m. For example, when the pair of multi-mode optical fibers 811-1, 811-4 are optically coupled to each other, the condenser lenses 821-1, 821-4 facing the respective end faces 811a of the multi-mode optical fibers 811-1, 811-4 are arranged such that their optical center axes 822-1, 822-4 are substantially put into coincidence with each other through the mirror 4m.

The respective multi-mode optical fibers 811-1 to 811-5 are arranged such that they are spaced apart from the condenser lenses 821-1 to 821-5 corresponding to the positions at which the respective multi-mode optical fibers 811-1 to 811-5 are arranged (facing the end faces 811a) by the focal length f (of the condenser lenses 821-1 to 821-5) plus a predetermined distance δ and the center axes 812-1 to 812-5 of light emitted from the end faces 811a of the multi-mode optical fibers 811-1 to 811-5 are substantially put into coincidence with the optical center axes 822-1 to 822-5 of the corresponding condenser lenses 821-1 to 821-5.

The aforementioned predetermined distance δ may be set to a value which depends on the core radius rc and the numerical aperture NA of the multi-mode optical fibers 811-1 to 811-5. Namely, it is set to the obtained from the aforementioned equation (4). In other words, the multi-mode optical fibers 811-1 to 811-5 are arranged such that the distances between the multi-mode optical fibers 811-1 to 811-5 and the corresponding condenser lenses 821-1 to 821-5 are substantially in conformity with the distance which is the focal length f of the condenser lenses 821-1 to 821-5 plus the predetermined length δ obtained from the equation (4).

Thus, the distances between the condenser lenses 821-1 to 821-5 and the mirror 4m can be set to a distance, which is substantially twice the focal length f of the condenser lenses 821-1 to 821-5. Therefore, as compared with the case where the condenser lenses are arranged such that the aforementioned distances are substantially in conformity with the focal length f, the number of condenser lenses, which can be disposed, can be increased and, therefore, the number of multi-mode optical fibers which can be incorporated for switching can be increased.

The aforementioned optical switch 800 can be designed according to the following specification, for example. Namely, the multi-mode optical fibers 811-1 to 811-5 are constituted by step-index type multi-mode optical fibers each having a core diameter of about 50 micro meters and an NA of about 0.2 and the condenser lenses 821-1 to 821-5 are constituted by convex lenses each having an opening diameter of about 2.5 mm and a focal length of about 4.9 mm. Further, the mirror 4m is configured such that the angle of the reflecting surface 41m can be selectively switched in steps of about 15 degree, for example.

Namely, the angle of the reflecting surface 41m of the mirror 4m is selectively switched in the aforementioned steps by the angle switching section 830, thus switching the pair of multi-mode optical fibers to be optically coupled to each other.

In this case, the distances between the respective condenser lenses 821-1 to 821-5 and the mirror 4m are set to about 9.8 mm, which is twice the focal length (about 4.9 mm). The distances between the multi-mode optical fibers 811-1 to 811-5 and the corresponding condenser lenses 821-1 to 821-5 are set to substantially the distance which is the focal length (about 4.9 mm) plus 122.5 micrometers, which is a value calculated from the equation (4).

[D-2] Effects and Advantages of the Optical Switch According to the Fourth Embodiment With the optical switch 800 according to the fourth embodiment configured as described above, an arbitrary pair of multi-mode optical fibers 811-1 to 811-5 are optically coupled to each other at the angle of the mirror 4m, and therefore light is propagated between the pair of multi-mode optical fibers which are optically coupled to each other.

For example, when the pair of multi-mode optical fibers 811-1 and 811-4 are optically coupled to each other through the condenser lenses 821-1, 821-4 and the mirror 4m, light emitted from the multi-mode optical fiber 811-1 is guided to the multi-mode optical fiber 811-4 through the condenser lens 821-1, the mirror 4m and the condenser lens 821-4 and light emitted from the multi-mode optical fiber 811-4 is guided to the multi-mode optical fiber 811-1 through the condenser lens 821-4, the mirror 4m and the condenser lens 821-1.

The angle of the reflecting surface 41m of the mirror 4m is selectively switched in the aforementioned steps by the angle switching section 830, thus switching the pair of multi-mode optical fibers to be optically coupled to each other, as previously described.

Particularly, by switching the angle of the reflecting surface 41m of the mirror 4m through the angle switching section 830, with reference to a single multi-mode optical fiber (for example, the multi-mode optical fiber 811-1), a multi-mode optical fiber among the other multi-mode optical fibers (the multi-mode optical fibers 811-2 to 811-5) can be selected, as the multi-mode optical fiber to be optically coupled thereto, whereby it is made possible to operate it as a 1×N (N=4 in this case) optical switch.

As described above, with the optical switch 800 according to the fourth embodiment of the present invention, the distances between the condenser lenses 821-1 to 821-5 and the mirror 4m can be set to about twice the focal length f of the condenser lenses 821-1 to 821-5, so that it is made possible to increase the number of condenser lenses which can be disposed, as compared with the case where the condenser lenses are arranged such that the distances between the condenser lenses 821-1 to 821-5 and the mirror 4m are substantially in conformity with the focal length f. In other words, it is possible to reduce the relative angles between the light axes 812-1 to 812-5 of light emitted from the multi-mode optical fibers 811-1 to 811-5 constituting the respective ports, thereby providing an effect of enabling increasing the number of ports. Namely, it is possible to increase the number of multi-mode optical fibers, which can be incorporated for switching, whereby there is attained an effect of being able to realize a optical switch which is adapted for use in multi-mode fibers and has a large number of switched channels.

In the aforementioned description, the present invention has been described, attention being focused on the fact that at least one pair of multi-mode optical fibers are optically coupled to each other by switching the angle of the reflecting surface 41m of the mirror 4m, wherein it is also possible to cause a plurality of pairs of multi-mode optical fibers to be optically coupled depending on the angle of the reflecting surface 41m of the mirror 4m as well as the relationship in terms of arrangement among the multi-mode optical fibers 811-1 to 811-5 and the condenser lenses 821-1 to 821-5.

Further, while in the aforementioned fourth embodiment there has been described in detail the case where five multi-mode optical fibers 811-1 to 811-5 are provided as the plurality of multi-mode optical fibers, the optical switch may be configured to include a plural number (other than five) of multi-mode optical fibers in order to provide a configuration for optically coupling an arbitrary pair of multi-mode optical fibers.

Further, by utilizing the optical switch according to the aforementioned fourth embodiment, an N×M optical switch as illustrated in FIG. 13 can be configured.

[E] Others

The present invention is not limited to the aforementioned respective embodiments and may be implemented by making various modifications thereto without departing from the spirit of the present invention.

Further, the disclosure of the aforementioned embodiments enables fabricating the devices according to the present invention.

What is claimed is:

1. An optical fiber device comprising:
   a first multi-mode optical fiber;
   a second multi-mode optical fiber having a core radius rc and a numerical aperture NA which are substantially the same as those of the first multi-mode optical fiber; and
   a first condenser lens and a second condenser lens which have substantially the same focal length;
   wherein
      the first multi-mode optical fiber and the second multi-mode optical fiber are optically coupled to each other at their end faces through the first condenser lens and the second condenser lens;
      the first condenser lens and the second condenser lens are arranged such that they are spaced apart from each other by four times the focal length and their optical center axes are substantially put into coincidence with each other;
      the first multi-mode optical fiber is arranged such that it is spaced apart from the first condenser lens by a distance larger than the focal length and the center axis of light emitted from the first multi-mode optical fiber is substantially put into coincidence with the optical center axis of the first condenser lens;
      the second multi-mode optical fiber is arranged such that it is spaced apart from the second condenser lens by a distance larger than the focal length and the center axis of light emitted from the second multi-mode optical fiber is substantially put into coincidence with the optical center axis of the second condenser lens;
      the first multi-mode optical fiber is arranged with respect to the first condenser lens such that a light ray proceeding from the outermost perimeter of the core of the first multi-mode optical fiber toward the optical center axis of the first multi-mode optical fiber and having a largest tilt angle with respect to the optical center axis of the first multi-mode optical fiber substantially passes through the position of the focal point of the first condenser lens between the first multi-mode optical fiber and the first condenser lens; and
      the second multi-mode optical fiber is arranged with respect to the second condenser lens such that a light ray proceeding or traveling from the outermost perimeter of the core of the second multi-mode optical fiber toward the optical center axis of the second multi-mode optical fiber and having a largest tilt angle with respect to the optical center axis of the second multi-mode optical fiber substantially passes through the position of the focal point of the second condenser lens between the second multi-mode optical fiber and the second condenser lens.

2. The optical fiber device according to claim 1, wherein additional optical member is interposed between the first condenser lens and the second condenser lens.

3. The optical fiber device according to claim 2, wherein as the additional optical member, there is provided a reflective member capable of reflecting incident light from the first multi-mode optical fiber or the second multi-mode optical fiber.

4. The optical fiber device according to claim 3, wherein the reflective member is constituted by a branch mirror having a light-reflecting surface which passes a part of incident light from the first multi-mode optical fiber or the second multi-mode optical fiber and reflects the remaining part to cause it to branch off.

5. The optical fiber device according to claim 1, wherein the distance between the first multi-mode optical fiber and the first condenser lens and the distance between the second multi-mode optical fiber and the second condenser lens are substantially equal to the sum of the focal length and a predetermined distance which depends on the core radius rc and the numerical aperture NA of the first and second multi-mode optical fibers.

6. An optical fiber device comprising:
   a first multi-mode optical fiber;
   a second multi-mode optical fiber having a core radius rc and a numerical aperture NA which are substantially the same as those of the first multi-mode optical fiber; and
   a first condenser lens and a second condenser lens which have substantially the same focal length:
   wherein
      the first multi-mode optical fiber and the second multi-mode optical fiber are optically coupled to each other at their end faces through the first condenser lens and the second condenser lens;
      the first condenser lens and the second condenser lens are arranged such that they are spaced apart from each other by four times the focal length and their optical center axes are substantially put into coincidence with each other;
      the first multi-mode optical fiber is arranged such that it is spaced apart from the first condenser lens by a distance larger than the focal length and the center axis of light emitted from the first multi-mode optical fiber is substantially put into coincidence with the optical center axis of the first condenser lens;
      the second multi-mode optical fiber is arranged such that it is spaced apart from the second condenser lens by a distance larger than the focal length and the center axis of light emitted from the second multi-mode optical fiber is substantially put into coincidence with the optical center axis of the second condenser lens;
      the distance between the first multi-mode optical fiber and the first condenser lens and the distance between the second multi-mode optical fiber and the second condenser lens are substantially equal to the sum of the focal length and a predetermined distance which depends on the core radius rc and the numerical aperture NA of the first and second multi-mode optical fibers; and
      the distance between the first multi-mode optical fiber and the first condenser lens and the distance between the second multi-mode optical fiber and the second condenser lens are substantially equal to the sum of the focal length and $\delta$ which is expressed by the following equation using the core radius rc and the numerical aperture NA $\delta = rc/\tan\{\arcsin(NA)\}$.

\* \* \* \* \*

UNITED STATES PATENT AND TRADEMARK OFFICE
CERTIFICATE OF CORRECTION

PATENT NO. : 7,313,301 B2  Page 1 of 1
APPLICATION NO. : 11/046780
DATED : December 25, 2007
INVENTOR(S) : Haruhiko Tabuchi It is certified that error appears in the above-identified patent and that said Letters Patent is hereby corrected as shown below:

Col. 28, line 27, delete "length:" and insert --length;--, therefor.

Signed and Sealed this

Thirteenth Day of May, 2008

JON W. DUDAS
*Director of the United States Patent and Trademark Office*